(12) United States Patent
Fasano et al.

(10) Patent No.: US 6,809,141 B2
(45) Date of Patent: Oct. 26, 2004

(54) SEGMENTAL COPOLYMERS AND AQUEOUS DISPERSIONS AND FILMS THEREFROM

(75) Inventors: David M. Fasano, Maple Glen, PA (US); Karl A. Bromm, Doylestown, PA (US); Willie Lau, Ambler, PA (US); Jack C. Thibeault, Doylestown, PA (US); David A. Larson, Green Lane, PA (US); Paul R. Van Rheenen, Warminster, PA (US)

(73) Assignee: Rohm and Haas Company, Philadelphia, PA (US)

(*) Notice: Subject to any disclaimer, the term of this patent is extended or adjusted under 35 U.S.C. 154(b) by 269 days.

(21) Appl. No.: 09/951,944

(22) Filed: Sep. 13, 2001

(65) Prior Publication Data

US 2002/0120050 A1 Aug. 29, 2002

Related U.S. Application Data

(60) Provisional application No. 60/232,414, filed on Sep. 14, 2000.

(51) Int. Cl.[7] .................................................. C08J 3/02
(52) U.S. Cl. ........................ 524/457; 524/458; 524/601
(58) Field of Search ................................ 524/458, 457, 524/609

(56) References Cited

U.S. PATENT DOCUMENTS

| | | | | |
|---|---|---|---|---|
| 3,862,077 | A | * 1/1975 | Schulz et al. ................ | 524/417 |
| 3,989,768 | A | 11/1976 | Milkovich et al. | |
| 5,028,677 | A | 7/1991 | Janowicz ...................... | 526/329 |
| 5,247,040 | A | 9/1993 | Amick et al. ................. | 526/286 |
| 5,264,530 | A | 11/1993 | Darmon et al. .............. | 526/194 |
| 5,521,266 | A | 5/1996 | Lau ............................. | 526/200 |
| 5,602,220 | A | 2/1997 | Haddleton et al. ........... | 526/172 |
| 5,703,169 | A | 12/1997 | Zajaczkowski et al. | |
| 5,703,170 | A | 12/1997 | Zajaczkowski et al. | |
| 5,731,377 | A | 3/1998 | Friel ........................... | 524/522 |
| 5,756,605 | A | 5/1998 | Moad et al. ................... | 526/93 |
| 5,770,646 | A | 6/1998 | Antonelli et al. | |
| 5,804,632 | A | 9/1998 | Haddleton et al. ........... | 524/458 |
| 5,936,026 | A | 8/1999 | Huybrechts et al. | |
| 5,955,532 | A | 9/1999 | Chang et al. | |
| 5,980,878 | A | 11/1999 | Torgerson et al. | |
| 6,017,992 | A | 1/2000 | Haddleton et al. ........... | 524/458 |
| 6,060,532 | A | 5/2000 | Frankel et al. ................ | 522/46 |
| 6,107,392 | A | 8/2000 | Antonelli et al. ............ | 524/504 |
| 6,113,882 | A | 9/2000 | Mougin et al. | |
| 6,291,620 | B1 | 9/2001 | Moad et al. | |

FOREIGN PATENT DOCUMENTS

| | | |
|---|---|---|
| WO | WO 95/19999 | 7/1995 |
| WO | WO 95/32228 | 11/1995 |
| WO | WO 95/32229 | 11/1995 |
| WO | WO 95/32255 | 11/1995 |
| WO | WO 96/15157 | 5/1996 |
| WO | WO99/03905 | 1/1999 |

OTHER PUBLICATIONS

Applications of Anionic Polymerization Research, R. P. Quirk Ed, ACS Symp. Ser. 696, 208(1998); "Practical Applications of Macromonomer Techniques for the Synthesis of Comb–Shaped Copolymers", Authors S. Roos, A.H. E. Muller, M. Kaufmann, W. Siol, C. Auschra.

Journal of Polymer Science Part A: Polymer Chemistry, vol. 34, 3173 3181; "Compatibilization of the PBA/PMMA Core/Shell Latex Interphase, I. Partitioning of PMMA Macromonomer in the PBA Seed Latex", Authors, V. Nelliappan, M. S. El–aasser, A. Klein, E. S. Daniels, and J. E. Roberts.

J. Macromol Sci.—Chem. A27(4) pp. 491–507 (1990), "Copolymerization of Polymethyl Methacrylate Macromers with n–Butyl Acrylate and Mechanical Properties Of the Graft Copolymers", Authors Hong–Quan Xie and Shi–Biao Zhou.

\* cited by examiner

Primary Examiner—William K. Cheung
(74) Attorney, Agent, or Firm—Richard R. Clikeman

(57) ABSTRACT

An aqueous dispersion of a segmental copolymer, wherein the aqueous dispersion has a Hard/Soft Balance Advantage value of at least 25% is disclosed. A method for preparing the aqueous dispersion of a segmental copolymer is also disclosed, as is a film produced thereby.

19 Claims, No Drawings

SEGMENTAL COPOLYMERS AND AQUEOUS DISPERSIONS AND FILMS THEREFROM

This application is a continuation-in-part of Ser. No. 60/232,414, filed Sep. 14, 2000.

The present invention relates to an aqueous dispersion of a segmental copolymer, wherein films formed from the aqueous dispersion display an improved balance of properties related to hardness and softness, and to the segmental copolymer of which the aqueous dispersion is comprised.

Polymeric films are typically formed by deposition of a solution or dispersion of a polymer in a solvent or dispersing medium, respectively. Evaporation of the layer thus formed will result in a continuous film for some polymer compositions, but not for others. For example, a dispersion including polymeric particles, the polymeric chains of which have a glass transition temperature in the range of −40° C. to 70° C., may form a continuous film, with the likelihood of such formation increasing for polymers having Tg values near, or below, the temperature at which film formation is attempted, often room temperature. Unfortunately, films that are easily formed often exhibit poor hardness related properties. They tend to be "soft" and tacky. This tackiness translates into a tendency for the surface of the film to retain dirt particles that contact it. Tackiness also translates into "block", the tendency for two films to stick to one another, or for a single film to stick to itself. The softness further translates into unrecoverable deformation, called "print". "Print" is observed when an object is placed upon a film and, upon removal, the imprint of the object does not go away.

It is, therefore, highly desirable to form films that have a "hardness" component. This hardness translates into films having surfaces that resist scratching, dirt pick-up, and block. Truly "hard" films are difficult to achieve because the relatively high glass transition temperature, "Tg", required to produce such films renders the actual formation of films difficult or impossible. When these "hard" films are achieved, for example, by adding high levels of a coalescent to an aqueous dispersion of a hard polymer, these films often are so dominated by the hardness characteristic that they fail to exhibit softness characteristics that can contribute to overall performance of the film. Hard films are often brittle films lacking the flexibility to elongate and bend, especially at low temperature (i.e., below 20° C.), a common requirement during use.

The invention of U.S. Pat. No. 6,060,532 sought, for example, to provide coatings having a good balance of low temperature flexibility, tensile strength, and dirt pick up resistance. Low temperature flexibility is a "softness" characteristic, while tensile strength and dirt pick up resistance are characteristic of "hardness". Coatings were formed from a binder polymer which was an elastomeric multi-stage emulsion polymer obtained by sequentially polymerizing, under emulsion polymerization conditions, a first monomer system free from polyethylenically unsaturated monomers, and which yields a first-stage polymer having a glass transition temperature from about −30° C. to about −60° C., and a second monomer system, likewise free from polyethylenically unsaturated monomers, and which yields a second-stage polymer, incompatible with the first-stage polymer, and having a glass transition temperature from 0° C. to 60° C. Used herein, these two-stage polymers are referred to a "soft/hard elastomers", or "SHE" polymers. While the SHE polymers of U.S. Pat. No. 6,060,532 did improve the balance of hard and soft properties over that of single stage polymers having similar overall compositions, there remained a need for yet further improvement in the hard/soft balance. It was further desired to achieve that improvement while maintaining excellent film formation behavior for aqueous binder systems completely free of coalescing agents, or containing only low levels of them.

We have, surprisingly, found that aqueous dispersions of segmental copolymers can be formed into films having an outstanding balance of properties related to hardness and softness. In particular, we have been able to produce comb copolymers and aqueous dispersions of comb copolymers by a commercially viable method and form them into films having an outstanding balance of properties related to hardness and softness. The polymers can, for example, be utilized in films cast onto substrate surfaces and in free standing films.

A first aspect of the present invention relates to an aqueous dispersion, comprising at least one segmental copolymer, wherein said aqueous dispersion has a Hard/Soft Balance Advantage value of at least 25%.

A second aspect of the present invention relates to a method of forming a film comprising the steps of:
(a) forming an aqueous dispersion of a segmental polymer;
(b) applying said aqueous dispersion to a substrate; and
(c) drying, or allowing to dry, said applied aqueous dispersion;
wherein said aqueous dispersion has a Hard/Soft Balance Advantage value of at least 25%.

A third aspect of the present invention relates to a method of forming a film comprising the steps of:
(a) forming an aqueous dispersion comprising a plurality of comb copolymer particles:
    wherein said comb copolymer particles comprise a comb copolymer; and
    wherein said comb copolymer comprises a backbone and at least one graft segment attached thereto;
(b) applying said aqueous dispersion to a substrate; and
(c) drying, or allowing to dry, said applied aqueous dispersion;
wherein said aqueous dispersion has a Hard/Soft Balance Advantage value of at least 25%.

A fourth aspect of the present invention relates to a film produced by the method of either the second aspect or the third aspect.

A further aspect relates to an aqueous dispersion wherein the comb copolymer is produced by a polymerization method comprising the steps of:
(a) forming a macromonomer aqueous emulsion comprising a plurality of water-insoluble particles of macromonomer, wherein said macromonomer comprises polymerized units of at least one first ethylenically unsaturated monomer, said macromonomer further having:
    (i) a degree of polymerization of from 10 to 1000;
    (ii) at least one terminal ethylenically unsaturated group;
    (iii) less than 5 weight percent polymerized acid-containing monomer, based on the weight of said macromonomer; and
    (iv) less than one mole percent of polymerized mercaptan-olefin compounds;
(b) forming a monomer composition comprising at least one second ethylenically unsaturated monomer; and
(c) combining at least a portion of said macromonomer aqueous emulsion and at least a portion of said monomer composition to form a polymerization reaction mixture; and (d) polymerizing said macromonomer with said second ethylenically unsaturated monomer in the presence of an initiator to produce said plurality of comb copolymer particles.

In a still further aspect, the comb copolymer has a weight average molecular weight of 50,000 to 2,000,000.

In yet another aspect, the graft segment of the comb copolymer is derived, as a polymerized unit, from a macromonomer; wherein the graft segment comprises, as polymerized units, from 5 weight percent to 50 weight percent of a non-methacrylate monomer, based on the weight of the macromonomer.

In another aspect, the graft segment of the comb copolymer is derived, as a polymerized unit, from a macromonomer; wherein the graft segment comprises, as polymerized units, less than 5 weight percent acid containing monomer, based on the total weight of said macromonomer.

In another aspect, the graft segment of the comb copolymer is derived, as a polymerized unit, from a macromonomer, wherein said graft segment has a degree of polymerization of from 10 to 1,000, where the degree of polymerization of said graft segment is expressed as the degree of polymerization of said macromonomer.

In another aspect, the graft segment of the comb copolymer has a glass transition temperature of 30° C. to 130° C.

In another aspect, the backbone of the comb copolymer has a glass transition temperature of −90° C. to 50° C.

Used herein, the following terms have these definitions:

The "backbone" of a polymer chain is a collection of polymerized monomer units attached to one another. The attachment is typically achieved by covalent bonding. "Non-terminal" monomer units are directly attached to at least two other monomer units. A "terminal" monomer unit resides at the end of the polymer chain and is directly attached to one other monomer unit. For example, the polymerized monomer units of the backbone may be derived from ethylenically unsaturated monomers.

A "linear" polymer (homopolymer or copolymer) is a polymer having a backbone that is not branched. As used herein, the term "linear" is also meant to include polymers wherein a minor amount of branching has occurred. For example, hydrogen abstraction may lead to branching during free radical polymerizations.

A "branched" polymer is a polymer having a first "backbone segment" that has other backbone segments (i.e., "branches") chemically attached to it through a "non-terminal" atom of the first backbone segment. Typically, this first backbone segment and all of the branches have the same, or similar, composition. Herein, the term "branching" is used to describe the structure of the backbone of the comb copolymer.

A "pendant" group is a group that is attached to the backbone of a polymer. The term pendant may be used to describe a group that is actually part of a polymerized monomer unit. For example, the hydroxyethyl group of a polymerized unit of 2-hydroxyethyl methacrylate may be referred to as a "pendant hydroxyethyl group", or as "pendant hydroxy functionality". It is also common to refer to large groups attached to a polymer backbone as "pendant" when those large groups are compositionally distinct from the backbone polymer. These large groups may themselves be polymer chains. For example, when a macromonomer becomes incorporated into a polymer chain by reaction with other monomers, the two carbons of its reactive double bond become part of the backbone, while the polymeric chain originally attached to the double bond of the macromonomer becomes a "pendant group" that may, for example, have a molecular weight of 500 to 100,000. A "pendant" group may further be described as "pendant to" the backbone.

A "terminal" group resides at the end of the polymer chain and is chemically attached to a terminal monomer unit. A terminal group may, for example, have a composition distinct from the composition of the backbone of the polymer. A "pendant" group may occur in a "terminal" position. As such, a "terminal" group is a special case of a "pendant" group.

A "macromonomer" of the present invention is any low molecular weight water-insoluble polymer or copolymer having at least one terminal ethylenically unsaturated group that is capable of being polymerized in a free radical polymerization process. The macromonomer of the present invention preferably has "low water solubility". By "low water solubility" it is meant having a water solubility of no greater than 150 millimoles/liter at 25° C. to 50° C. In contrast the "acid containing macromonomer", described herein below, of the present invention is water soluble. By "low molecular weight" it is meant that the macromonomer has a degree of polymerization of from 5 to 1,000, preferably from 10 to 1,000, more preferably 10 to 200, and most preferably from about 20 to less than 50. By "degree of polymerization" it is meant the number of polymerized monomer units present in the macromonomer. See e.g., Kawakami in the "Encyclopedia of Polymer Science and Engineering", Vol. 9, pp. 195–204, John Wiley & Sons, New York, 1987. Typically, the macromonomer polymer chain contains first ethylenically unsaturated monomers, as polymerized units. Preferably, the first ethylenically unsaturated monomer is selected to impart low water solubility to the macromonomer. Although it is most preferred that every unit of macromonomer have at least one terminal ethylenically unsaturated group that is capable of being polymerized in a free radical polymerization process, the percentage of macromonomer units having such a terminal ethylenically unsaturated group is typically sufficient to prepare the desired comb copolymer of the present invention when that percentage is less than 70%, preferably at less than 80%, and more preferably at less than 85%.

The term "macromonomer aqueous emulsion" is used herein to describe an aqueous emulsion containing macromonomer dispersed therein as water insoluble particles.

A "graft segment" is a polymer chain occupying a pendant position along the polymer backbone. A graft segment may include, as polymerized units, one type of monomer or more than one type of monomer. The composition of a graft segment is different from the composition of the backbone polymer to which it is attached, in contrast to a "branch segment" of a branched backbone which has a composition which is the same as, or similar to, other portions the branched backbone of which it is a part. A "terminal graft segment" resides at an end of a backbone polymer chain and is chemically attached to that backbone polymer chain. A "terminal graft segment" is a special case of a "pendant graft segment".

"Graft copolymers" are macromolecules formed when polymer or copolymer chains are chemically attached as side chains to a polymeric backbone. Those side chains are the "graft segments" described herein above. Because graft copolymers often chemically combine unlike polymeric segments in one macromolecule, these copolymers have unique properties compared to the corresponding random copolymer analogues. These properties include, for example, mechanical film properties resulting from thermodynamically driven microphase separation of the copolymer, and decreased melt viscosities resulting in part from the segmental structure of the graft copolymer, and from separation of a soft (i.e., low Tg) phase. With respect to the latter, reduced melt viscosities can advantageously improve processability of the polymer. See e.g., Hong-Quan Xie and Shi-Biao Zhou, J. Macromol. Sci.-Chem., A27(4), 491–507 (1990); Sebastian Roos, Axel H. E. Müller, Marita Kaufmann, Werner Siol and Clenens Auschra, "Applications of Anionic Polymerization Research", R. P. Quirk, Ed., ACS Symp. Ser. 696, 208 (1998). The graft copolymer of the present invention is a comb copolymer. Herein, the terms "graft copolymer" and "comb copolymer" are used interchangeably.

The term "comb copolymer," as used herein, is a type of graft copolymer, wherein the polymeric backbone of the graft copolymer is linear, or essentially linear, and, preferably, each side chain (graft segment) of the graft copolymer is formed by a "macromonomer" that is grafted to the polymer backbone. The comb copolymers may, for example, be prepared by the free radical copolymerization of macromonomer with conventional monomer (e.g., second ethylenically unsaturated monomer). Used herein, a comb copolymer may be one, or more than one type of comb copolymer, i.e., at least one comb copolymer.

A "block copolymer" is a copolymer having a backbone characterized by the presence of two or more "blocks". A "block" is a segment of copolymer backbone having a particular and distinct composition. See e.g., G. Odian "Principles of Polymerization", Third Edn., pp. 142–149, John Wiley & Sons, New York, 1991. For example, a block could be composed entirely of styrene monomer, present as polymerized units. At least two blocks differing in composition must be present in a block copolymer, however, more than one block of a given composition may be present. For example, a poly(styrene)-b-poly(butadiene)-b-poly(styrene) has two poly(styrene) blocks joined by a poly(butadiene) block. Blocks are typically at least 10 monomer units, preferably at least 50 monomer units, and more preferably at least 100 monomer units in length. Used herein, the term block copolymer refers to one or more types of block copolymer, i.e., at least one block copolymer.

A "random copolymer" is a copolymer having monomers, as polymerized units, randomly distributed along its backbone. Used herein, the term "random" has its usual meaning in the art of polymerization. For example, the distribution of monomer units along a polymer chain prepared by emulsion polymerization is dictated not only by the relative amounts of each type of monomer present at any point during the polymerization, but also by such factors as, for example, the tendency of each monomer type to react with itself relative to its tendency to react with each of the other types of monomer present. These reactive tendencies are defined by reactivity ratios which are well know for many monomer combinations. See e.g., G. Odian "Principles of Polymerization", Third Edn., pp. 460–492, John Wiley & Sons, New York, 1991.

The term "segmental copolymer" includes "block copolymers" and "comb copolymers". Used herein, the term segmental copolymer refers to one or more types of segmental copolymer, i.e., at least one segmental copolymer.

The term "SHE copolymer" refers to a "soft/hard elastomer" which is a multi-stage copolymer prepared by sequentially polymerizing, under emulsion polymerization conditions, first monoethylenically unsaturated monomers to yield a first-stage polymer having a Tg of −60° C. to −30° C., and then polymerizing second monoethylenically unsaturated monomers to yield a second-stage polymer having a Tg of 0° C. to 60° C. The SHE copolymer further includes low levels (up to 5 percent by weight, based on total copolymer) of either a photosensitive benzophenone or phenylketone compound, or a photosensitive benzophenone monomer, as polymerized units. The SHE copolymers referred to herein are disclosed in U.S. Pat. No. 6,060,532.

An "oligomer" is a polymer having a low molecular weight. By "low molecular weight" it is meant that the oligomer has a degree of polymerization of from 5 to 1,000, preferably from 10 to 1,000, more preferably 10 to 200, and most preferably from about 20 to less than 50.

An "aqueous dispersion of a segmental copolymer" is an aqueous medium in which are dispersed a plurality of particles of segmental copolymer. Used herein, an "aqueous dispersion of a segmental copolymer" is an "aqueous copolymer composition".

"Tg" is the "glass transition temperature" of a polymeric phase. The glass transition temperature of a polymer is the temperature at which a polymer transitions from a rigid, glassy state at temperatures below Tg to a fluid or rubbery state at temperatures above Tg. The Tg of a polymer is typically measured by differential scanning calorimetry (DSC) using the mid-point in the heat flow versus temperature transition as the Tg value. A typical heating rate for the DSC measurement is 20 Centigrade degrees per minute. The Tg of various homopolymers may be found, for example, in *Polymer Handbook*, edited by J. Brandrup and E. H. Immergut, Interscience Publishers. The Tg of a copolymer is estimated by using the Fox equation (T. G. Fox, Bull. *Am. Physics Soc.*, Volume 1, Issue No. 3, page 123 (1956)). A two-phase system resulting from the formation of a film from a segmental copolymer having two types of segment, each immiscible with the other, typically yields two measurable glass transition temperatures. For such a comb copolymer, one Tg can be measured, or calculated, for the phase formed by the backbone, and another Tg for the phase formed by the graft segment. An "average Tg", or "overall Tg" may be calculated for such systems as a weighted average of the amount of polymer in each phase of a given Tg. This average Tg for a two-phase system will equal the single Tg calculated for a random copolymer having the same overall composition as that of a copolymer for which two Tg values may be calculated or measured.

When a substance (e.g., a coalescent) having some degree of solubility in a polymer is imbibed by that polymer, the softening temperature of the polymer decreases. This plasticization of the polymer can be characterized by measuring the "effective Tg" of the polymer, which typically bears an inverse relationship to the amount of solvent or other substance contained in the polymer. The "effective Tg" of a polymer containing a known amount of a substance dissolved within is measured just as described above for "Tg". Alternatively, the "effective Tg" may be estimated by using the Fox equation (supra), assuming a value for Tg (e.g., the freezing point) of the solvent or other substance contained in the polymer.

Synthetic polymers are almost always a mixture of chains varying in molecular weight, i.e., there is a "molecular weight distribution", abbreviated "MWD". For a homopolymer, members of the distribution differ in the number of monomer units which they contain. This way of describing a distribution of polymer chains also extends to copolymers. Given that there is a distribution of molecular weights, the most complete characterization of the molecular weight of a given sample is the determination of the entire molecular weight distribution. This characterization is obtained by separating the members of the distribution and then quantitating the amount of each that is present. Once this distribution is in hand, there are several summary statistics, or moments, which can be generated from it to characterize the molecular weight of the polymer.

The two most common moments of the distribution are the "weight average molecular weight", "$M_w$", and the "number average molecular weight", "$M_n$". These are defined as follows:

$$M_w = \Sigma(W_i M_i)/\Sigma W_i = \Sigma(N_i M_i^2)/\Sigma N_i M_i$$

$$M_n = \Sigma W_i/\Sigma(W_i/M_i) = \Sigma(N_i M_i)/\Sigma N_i$$

where:

$M_i$=molar mass of $i^{th}$ component of distribution $W_i$=weight of $i^{th}$ component of distribution $N_i$=number of chains of $i^{th}$ component and the summations are over all the components in the distribution. $M_w$ and $M_n$ are typically computed from the MWD as measured by Gel Permeation Chromatography (see the Experimental Section).

"Particle size" is the diameter of a particle.

The "average particle size" determined for a collection of particles (e.g., macromonomer particles, or particles of graft copolymer) the "weight average particle size", "$d_w$", as measured by Capillary Hydrodynamic Fractionation technique using a Matec CHDF 2000 particle size analyzer equipped with a HPLC type Ultra-violet detector.

The "Advantage term", designated "A" herein, is a term that defines the performance of an aqueous dispersion of a polymer (herein the polymer is typically a segmental copolymer, preferably a comb copolymer) in a specific test, or a battery of tests, relative to a control, which is an aqueous dispersion of a random copolymer having the same overall composition as the segmental copolymer with which it is being compared. The advantage term for performance in a single test is defined as follows:

$$A = [(P/P_{control}) - 1] \times 100\%,$$

where P is the performance of a first material, as an aqueous dispersion, in a given test, and $P_{control}$ is the performance in the same test of another material, as an aqueous dispersion, with which that first material is being compared. The value of an "Advantage term" is referred to as the corresponding "Advantage value", given in units of percent. In determining the value of the Advantage term (i.e., the "Advantage value") for an aqueous dispersion of a given segmental copolymer, the control aqueous dispersion is that of a random copolymer having the same overall composition as the segmental copolymer being compared to it, and present in the aqueous dispersion at the same concentration as the segmental copolymer. When the "Advantage value" for an aqueous dispersion of a polymer-polymer or polymer-oligomer blend is determined herein, the control polymer is an aqueous dispersion of a random copolymer having the same overall composition as the blend. For example, a 50:50 (weight:weight) blend of polymer A composed of, as polymerized units, 30 mole percent of monomer X and 70 mole % of monomer Y, with polymer B composed of, as polymerized units, only monomer Y, would be compared with a random copolymer having 15 mole % of monomer X and 85 mole % of monomer Y.

Four tests measuring "hardness" are described herein and utilized to differentiate among various copolymers (as aqueous dispersions) in the Experimental Section herein below. "$A_K$", "$A_T$", "$A_S$", and "$A_B$" are the advantage terms derivable from the "Konig Pendulum Hardness", "Finger Tack", "Tensile Strength", and "Peel Block Resistance" tests, respectively. As such, they are referred to as the "Konig Hardness Advantage term", the "Tack Advantage term", the "Tensile Strength Advantage term", and the "Block Advantage term", respectively. Used herein, "Konig" and "Konig Hardness" may be used interchangeably with "Konig Pendulum Hardness"; "Tack" may be used interchangeably with "Finger Tack", and "Block" and "Block Resistance" may be used interchangeably with "Peel Block Resistance".

Two tests measuring "softness" are described herein and utilized to differentiate among various copolymers (as aqueous dispersions) in the Experimental Section herein below. "$A_E$", and "$A_F$" are the advantage terms derivable from the tensile elongation test and the low temperature mandrel flexibility test, respectively. As such, they are referred to as the "Elongation Advantage term" and the "Flexibility Advantage term", respectively. The temperature selected for the mandrel flexibility test is chosen to be equal to or less than the overall glass transition temperature, Tg, of the copolymer film being tested. This temperature is chosen, herein, to be −35° C., unless specified otherwise.

For any given material, the average of the experimentally determined values for the four "hardness" advantage terms are averaged to give the "Hardness Advantage Term", "$A_{Hard}$". Similarly, the average of the experimentally determined values for the two "softness" advantage terms are averaged to give the "Softness Advantage Term", "$A_{Soft}$". "$A_{Hard}$" and "$A_{Soft}$" are then averaged to give "$A_{HSB}$", the "Hard/Soft Balance Advantage term", abbreviated herein as "$A_{HSB}$". The following expressions define "$A_{Hard}$", "$A_{Soft}$", and "$A_{HSB}$":

$$A_{Hard} = (A_K + A_T + A_S + A_B)/4;$$

$$A_{Soft} = (A_E + A_F)/2; \text{ and}$$

$$A_{HSB} = (A_{Hard} + A_{Soft})/2.$$

In any equation for an Advantage term used herein to describe performance in a given test, it is assumed that "P" and "$P_{control}$" (see the general equation for "A" above) are measured by that test method, so that there is no need to provide additional subscripts for those performance terms.

When a material does not form a film under the conditions of film formation used in preparing specimens for the tests, each advantage term is assigned a value of −100%. In such cases, "$A_{HSB}$" also becomes −100%. "$A_{HSB}$" is then a good measure of the three-way balance of film hardness, film softness, and the ability to form a film.

The segmental copolymers of the present invention preferably have Hard/Soft Balance Advantage Values of at least 25%, more preferably from 40% to 1,500%, and most preferably from 100% to 1,000%.

Estimation of whether a polymer and another component (i.e., another polymer or a solvent) will be miscible may be made according to the well-known methods delineated in D. W. Van Krevelen, *Properties of Polymers*, 3$^{rd}$ Edition, Elsevier, pp. 189–225, 1990. For example, Van Krevelen defines the total solubility parameter ($\delta_t$) for a substance by:

$$\delta_t^2 = \delta_d^2 + \delta_p^2 + \delta_h^2,$$

where $\delta_d$, $\delta_p$, and $\delta_h$ are the dispersive, polar, and hydrogen bonding components of the solubility parameter, respectively. Values for $\delta_d$, $\delta_p$, and $\delta_h$ have been determined for many solvents, polymers, and polymer segments, and can be estimated using the group contribution methods of Van Krevelen. For example, to estimate whether a polymer having a given composition will be miscible with a particular solvent, one calculates $\delta_t^2$ for the polymer and $\delta_t^2$ for the solvent. Typically, if the difference between the two, $\Delta\delta_t^2$, is greater than 25 (i.e., $\Delta\delta_t>5$), then the polymer and the solvent will not be miscible.

If, instead, it is desired to determine whether two polymers, differing in composition, will be miscible, the same calculations may be carried out, but the predicted upper limit of $\Delta\delta_t^2$ for miscibility will decrease as the molecular weight of one or both of polymers under consideration increases. This decrease is thought to parallel the decrease in entropy of mixing which occurs as the molecular weight of the components being mixed increases. For example, two polymers, each having a degree of polymerization of 100, will likely be immiscible even if the value of $\Delta\delta_t^2$ for their mixture is 9, or even 4 (i.e., $\Delta\delta_t=3$, or even 2). Still higher molecular weight polymers may be immiscible at even lower values of $\Delta\delta_t^2$. To estimate whether a graft segment of a comb copolymer of the present invention, having a given composition, will be miscible with a backbone having another composition, one calculates $\delta_t^2$ for the graft segment and $\delta_t^2$ for the backbone. Typically, if the difference between the two, $\Delta\delta_t^2$, is greater than 9 (i.e., $\Delta\delta_t>3$), then the graft segment should be immiscible with the backbone such that a film formed by the comb copolymer would have two distinct types of polymeric phase. It should be noted, however, that immiscibility between two polymers having degrees of polymerization of approximately 100 or more may occur even when the calculated value of $\Delta\delta_t^2$, is between 1 and 9 (i.e., $\Delta\delta_t$ of 1 to 3), due to the unfavorable entropy effects associated with very long polymeric chains. Similar calculation can be performed to determine whether a film formed from a block copolymer will have more than one polymeric phase. Because it is desirable that the graft segment not be miscible with the backbone, the Van Krevelen calculations of miscibility provide useful estimates of whether a given pair of compositions of the graft segment and backbone will result in phase separation in, for example, films formed from the segmental copolymer.

A preferred method of preparing the graft copolymers of the present invention and their aqueous dispersions is by emulsion polymerization. A preferred process for this preparation includes (a) forming, by polymerization of at least one first ethylenically unsaturated monomer, a macromonomer aqueous emulsion containing one or more water-insoluble particles of macromonomer; (b) forming a monomer composition containing at least one second ethylenically unsaturated monomer; and (c) combining at least a portion of the macromonomer aqueous emulsion and at least a portion of the monomer composition to form a "polymerization reaction mixture". The macromonomer and second ethylenically unsaturated monomer are polymerized in the presence of an initiator to form graft copolymer particles.

The macromonomer of the present invention is present in the macromonomer aqueous emulsion as water insoluble particles. The macromonomer is any low molecular weight water-insoluble polymer or copolymer having at least one terminal ethylenically unsaturated group that is capable of being polymerized in a free radical polymerization process.

The macromonomer contains, as polymerized units, at least one first ethylenically unsaturated monomer. Preferably, the first ethylenically unsaturated monomer is selected to impart low or no water solubility to the macromonomer as previously described herein.

Suitable first ethylenically unsaturated monomers for use in preparing macromonomer include for example methacrylate esters, such as $C_1$ to $C_{18}$ normal or branched alkyl esters of methacrylic acid, including methyl methacrylate, ethyl methacrylate, n-butyl methacrylate, lauryl methacrylate, stearyl methacrylate; acrylate esters, such as $C_1$ to $C_{18}$ normal or branched alkyl esters of acrylic acid, including methyl acrylate, ethyl acrylate, n-butyl acrylate and 2-ethylhexyl acrylate; styrene; substituted styrenes, such as methyl styrene, a-methyl styrene or t-butyl styrene; olefinically unsaturated nitriles, such as acrylonitrile or methacrylonitrile; olefinically unsaturated halides, such as vinyl chloride, vinylidene chloride or vinyl fluoride; vinyl esters of organic acids, such as vinyl acetate; N-vinyl compounds such as N-vinyl pyrrolidone; acrylamide; methacrylamide; substituted acrylamides; substituted methacrylamides; hydroxyalkylmethacrylates such as hydroxyethylmethacrylate; hydroxyalkylacrylates; basic substituted (meth) acrylates and (meth)acrylamides, such as amine-substituted methacrylates including dimethylaminoethyl methacrylate, tertiary-butylaminoethyl methacrylate and dimethylaminopropyl methacrylamide and the likes; dienes such as 1,3-butadiene and isoprene; vinyl ethers; or combinations thereof. The term "(meth)", i.e., with parentheses, as used herein means that the "meth" is optionally present. For example, "(meth)acrylate" means methacrylate or acrylate.

The first ethylenically unsaturated monomer can also be a functional monomer including for example monomers containing hydroxy, amido, aldehyde, ureido, polyether, glycidylalkyl, keto functional groups or combinations thereof. These functional monomers are generally present in the macromonomer at a level of from 0.1 weight percent to 15 weight percent and more preferably from 0.5 weight percent to 10 weight percent, and most preferably from 1.0 to 3 weight percent, based on the total weight of the graft copolymer. Used herein, all ranges are inclusive and combinable. Examples of functional monomers include keto-functional monomers such as the acetoacetoxy esters of hydroxyalkyl acrylates and methacrylates (e.g., acetoacetoxyethyl methacrylate) and keto-containing amides (e.g., diacetone acrylamide); allyl alkyl methacrylates or acrylates; glycidylalkyl methacrylates or acrylates; or combinations thereof. Such functional monomers can provide crosslinking if desired.

Typically, the macromonomer also contains as polymerized units less than 10 weight percent, preferably less than 5 weight percent, more preferably less than 2 weight percent, and most preferably less than less than 1 weight percent acid containing monomer, based on the total weight of the macromonomer. In a most preferred embodiment, the macromonomer contains no acid containing monomer. Used herein, "acid containing monomer" and "acid functional monomer" are used interchangeably. By "acid containing monomer" it is meant any ethylenically unsaturated monomer that contains one or more acid functional groups or functional groups that are capable of forming an acid (e.g., an anhydride such as methacrylic anhydride or tertiary butyl methacrylate). Examples of acid containing monomers include, for example, carboxylic acid bearing ethylenically unsaturated monomers such as acrylic acid, methacrylic acid, itaconic acid, maleic acid and fumaric acid; acryloxypropionic acid and (meth)acryloxypropionic acid; sulphonic acid-bearing monomers, such as styrene sulfonic acid, sodium vinyl sulfonate, sulfoethyl acrylate, sulfoethyl methacrylate, ethylmethacrylate-2-sulphonic acid, or 2-acrylamido-2-methylpropane sulphonic acid; phosphoethylmethacrylate; the corresponding salts of the acid containing monomer; or combinations thereof.

The macromonomer may contain, as a polymerized unit, a "non-methacrylate monomer". Used herein, a "non-methacrylate monomer" is any first ethylenically unsaturated monomer that is not a methacrylate. For example, butyl acrylate is a first ethylenically unsaturated monomer that is a non-methacrylate monomer. The macromonomer may be free of non-methacrylate monomer, but typically it contains, as polymerized units, at least one non-methacrylate monomer unit, preferably 5 weight percent to 50 weight percent non-methacrylate monomer, more preferably 10 weight percent to 35 weight percent non-methacrylate monomer, and most preferably 15 weight percent to 25 weight percent of non-methacrylate monomer, based on the weight of the macromonomer.

The macromonomer also contains, as polymerized units, less than 1 mole percent, preferably less than 0.5 mole percent, and more preferably no mercapto-olefin compounds, based on the total moles of monomer, present as polymerized units, in the macromonomer. Used herein, "mercapto-olefin" and "mercaptan-olefin" are used interchangeably. These mercapto-olefin compounds are those as disclosed in U.S. Pat. No. 5,247,000 by Amick. The mercapto-olefin compounds described in Amick have ester functional groups, which are susceptible to hydrolysis.

In a preferred embodiment of the present invention, the macromonomer is composed of 50 weight percent to 95 weight percent, more preferably from 65 to 90 weight percent, and most preferably from 75 to 85 weight percent, based on total weight of macromonomer, of at least one $\alpha$-methyl vinyl monomer, a non $\alpha$-methyl vinyl monomer terminated with an $\alpha$-methyl vinyl monomer, or combinations thereof. The macromonomer may even be composed of 100 weight percent $\alpha$-methyl vinyl monomers, non $\alpha$-methyl vinyl monomers terminated with $\alpha$-methyl vinyl monomers, or combinations thereof, based on the total weight of the macromonomer. The phrase "non $\alpha$-methyl vinyl monomer terminated with an $\alpha$-methyl vinyl monomer" means that, when a vinyl monomer bearing no $\alpha$-methyl group is present, as polymerized units, in the macromonomer, the macromonomer must be terminated by a unit derived from an $\alpha$-methyl vinyl monomer. For example, while styrene might be present, as polymerized units, in a macromonomer chain, that macromonomer chain would be terminated by $\alpha$-methyl styrene, or some other $\alpha$-methyl vinyl monomer. Suitable $\alpha$-methyl vinyl monomers include, for example, methacrylate esters, such as $C_1$ to $C_{18}$ normal or branched alkyl esters of methacrylic acid, including methyl methacrylate, ethyl methacrylate, butyl methacrylate, 2-ethylhexyl methacrylate, isobornyl methacrylate, lauryl methacrylate, or stearyl methacrylate; hydroxyalkyl methacrylates such as hydroxyethyl methacrylate; glycidylmethacrylate; phenyl methacrylate; methacrylamide; methacrylonitrile; or combinations thereof.

One skilled in the art will recognize that there are many ways to prepare the macromonomer useful in the present invention. For example, the macromonomer may be prepared by a high temperature (e.g., at least 150° C.) continuous process such as disclosed in U.S. Pat. No. 5,710,227 or EP-A-1,010,706, published Jun. 21, 2000. In a preferred continuous process, a reaction mixture of first ethylenically unsaturated monomers is passed through a heated zone having a temperature of at least 150° C., and more preferably at least 275° C. The heated zone may also be maintained at a pressure above atmospheric pressure (e.g., greater than 3,000 kPa=greater than 30 bar). The reaction mixture of monomers may also optionally contain a solvent such as water, acetone, methanol, isopropanol, propionic acid, acetic acid, dimethylformamide, dimethylsulfoxide, methylethylketone, or combinations thereof.

The macromonomer useful in the present invention may also be prepared by polymerizing first ethylenically unsaturated monomers in the presence of a free radical initiator and a catalytic metal chelate chain transfer agent (e.g., a transition metal chelate). Such a polymerization may be carried out by a solution, bulk, suspension, or emulsion polymerization process. Suitable methods for preparing the macromonomer using a catalytic metal chelate chain transfer agent are disclosed in for example U.S. Pat. Nos. 4,526,945, 4,680,354, 4,886,861, 5,028,677, 5,362,826, 5,721,330, and 5,756,605; European publications EP-A-0199,436, and EP-A-0196783; and PCT publications WO 87/03605, WO 96/15158, and WO 97/34934.

Preferably, the macromonomer useful in the present invention is prepared by an aqueous emulsion free radical polymerization process using a transition metal chelate complex. Preferably, the transition metal chelate complex is a cobalt (II) or (III) chelate complex such as, for example, dioxime complexes of cobalt (II), cobalt (II) porphyrin complexes, or cobalt (II) chelates of vicinal iminohydroxyimino compounds, dihydroxyimino compounds, diazadihydroxyiminodialkyldecadienes, or diazadihydroxyiminodialkylundecadienes, or combinations thereof. These complexes may optionally include bridging groups such as $BF_2$, and may also be optionally coordinated with ligands such as water, alcohols, ketones, and nitrogen bases such as pyridine. Additional suitable transition metal complexes are disclosed in for example U.S. Pat. Nos. 4,694,054; 5,770,665; 5,962,609; and 5,602,220. A preferred cobalt chelate complex useful in the present invention is Co II (2,3-dioxyiminobutane-$BF_2$)$_2$, the Co III analogue of the aforementioned compound, or combinations thereof. The spatial arrangements of such complexes are disclosed in for example EP-A-199436 and U.S. Pat. No. 5,756,605.

In preparing macromonomer by an aqueous emulsion polymerization process using a transition metal chelate chain transfer agent, at least one first ethylenically unsaturated monomer is polymerized in the presence of a free radical initiator and the transition metal chelate according to conventional aqueous emulsion polymerization techniques. Preferably, the first ethylenically unsaturated monomer is an $\alpha$-methyl vinyl monomer as previously described herein.

The polymerization to form the macromonomer is preferably conducted at a temperature of from 20° C. to 150° C., and more preferably from 40° C. to 95° C. The solids level at the completion of the polymerization is typically from 5 weight percent to 70 weight percent, and more preferably from 30 weight percent to 60 weight percent, based on the total weight of the aqueous emulsion.

The concentration of initiator and transition metal chelate chain transfer agent used during the polymerization process is preferably chosen to obtain the desired degree of polymerization of the macromonomer. Preferably, the concentration of initiator is from 0.2 weight percent to 3 weight percent, and more preferably from 0.5 weight percent to 1.5 weight percent, based on the total weight of monomer. Preferably, the concentration of transition metal chelate chain transfer agent is from 5 ppm to 200 ppm, and more preferably from 10 ppm to 100 ppm, based on the total monomers used to form the macromonomer.

The first ethylenically unsaturated monomer, initiator, and transition metal chelate chain transfer agent may be added in any manner known to those skilled in the art to carry out the polymerization. For example, the monomer, initiator and transition metal chelate may all be present in the aqueous emulsion at the start of the polymerization process (i.e., a batch process). Alternatively, one or more of the components may be gradually fed to an aqueous solution (i.e., a continuous or semi-batch process). For example, it may be desired to gradually feed the entire or a portion of the initiator, monomer, and/or transition metal chelate to a solution containing water and surfactant. In a preferred embodiment, at least a portion of the monomer and transition metal chelate are gradually fed during the polymerization, with the remainder of the monomer and transition metal chelate being present in the aqueous emulsion at the start of the polymerization. In this embodiment, the monomer may be fed as is, or suspended or emulsified in an aqueous solution prior to being fed.

Any suitable free radical initiator may be used to prepare the macromonomer. The initiator is preferably selected based on such parameters as its solubility in one or more of the other components (e.g., monomers, water); half life at the desired polymerization temperature (preferably a half life within the range of from about 30 minutes to about 10 hours), and stability in the presence of the transition metal chelate. Suitable initiators include for example azo compounds such as 2,2'-azobis (isobutyronitrile), 4,4'-azobis(4-cyanovaleric acid), 2,2'-azobis [2-methyl-N-(1,1-bis (hydroxymethyl)-2-(hydroxyethyl)]-propionamide, and 2,2'-azobis [2-methyl-N-(2-hydroxyethyl)]-propionamide; peroxides such as t-butyl hydroperoxide, benzoyl peroxide; sodium, potassium, or ammonium persulphate or combinations thereof. Redox initiator systems may also be used, such as for example persulphate or peroxide in combination with a reducing agent such as sodium metabisulphite, sodium bisulfite, sodium formaldehyde sulfoxylate, isoascorbic acid, or combinations thereof. Metal promoters, such as iron, may also optionally be used in such redox initiator systems. Also, buffers, such as sodium bicarbonate may be used as part of the initiator system.

An emulsifier is also preferably present during the aqueous emulsion polymerization process to prepare the macromonomer. Any emulsifier may be used that is effective in emulsifying the monomers such as for example anionic, cationic, or nonionic emulsifiers. In a preferred embodiment, the emulsifier is anionic such as for example sodium, potassium, or ammonium salts of dialkylsulphosuccinates; sodium, potassium, or ammonium salts of sulphated oils; sodium, potassium, or ammonium salts of alkyl sulphonic acids, such as sodium dodecyl benzene sulfonate; sodium, potassium, or ammonium salts of alkyl sulphates, such as sodium lauryl sulfate; ethoxylated alkyl ether sulfates; alkali metal salts of sulphonic acids; C12 to C24 fatty alcohols, ethoxylated fatty acids or fatty amides; sodium, potassium, or ammonium salts of fatty acids, such as Na stearate and Na oleate; or combinations thereof. The amount of emulsifier in the aqueous emulsion is preferably from 0.05 weight percent to 10 weight percent, and more preferably from 0.3 weight percent to 3 weight percent, based on the total weight of the monomers.

The macromonomer thus prepared is emulsion polymerized with at least one second ethylenically unsaturated monomer to form a copolymer composition containing graft copolymer particles. The polymerization is carried out by providing the macromonomer as water insoluble particles in a macromonomer aqueous emulsion and the second ethylenically unsaturated monomer in a monomer composition. At least a portion of the macromonomer aqueous emulsion is combined with at least a portion of the monomer composition to form a polymerization reaction mixture that is polymerized in the presence of an initiator.

Although in no way intending to be bound by theory, it is believed that, by providing the macromonomer in the form of water insoluble macromonomer particles in an aqueous emulsion and providing the second ethylenically unsaturated monomer in a separate monomer composition, upon combination the second ethylenically unsaturated monomer diffuses through the aqueous phase and then into the macromonomer particles where the polymerization occurs. Preferably, the diffusion of the second ethylenically unsaturated monomer into the macromonomer particles is evidenced by swelling of the macromonomer particles. Prior to being combined with the monomer composition, the macromonomers are present in plural discrete particles dispersed in the aqueous phase. Preferably, these plural macromonomer particles have previously been formed by aqueous emulsion polymerization, and the resultant macromonomer aqueous emulsion is combined with the monomer composition and subsequently polymerized without being isolated. Addition of the monomer composition to the macromonomer aqueous emulsion results initially in the presence of plural monomer droplets in the aqueous emulsion as separate entities distributed among, but not in direct contact with, the plural macromonomer particles. That is, the monomer droplets are separated from the macromonomer particles, and from each other, by an aqueous phase. Individual monomer molecules must then exit the monomer droplet, dissolve in the aqueous phase, diffuse through that aqueous phase to a macromonomer particle, and enter that macromonomer particle where polymerization to form the graft copolymer (preferably, comb copolymer) occurs. Because the water insoluble macromonomers are unable to diffuse through the aqueous phase, it is essential that the monomer droplets not include water insoluble macromonomer if gel formation is to be avoided and if the number of particles initially established by the macromonomer particles is to be maintained during polymerization of monomers with macromonomers.

The macromonomer aqueous emulsion useful in the present invention may be formed in any manner known to those skilled in the art. For example, the macromonomer, produced by any known method, may be isolated as a solid (e.g., spray dried) and emulsified in water. Also, for example, the macromonomer, if prepared via an emulsion or aqueous based polymerization process, may be used as is, or diluted with water or concentrated to a desired solids level.

In a preferred embodiment of the present invention, the macromonomer aqueous emulsion is formed from the emulsion polymerization of at least one first ethylenically unsaturated monomer in the presence of a transition metal chelate chain transfer agent as described previously herein. This embodiment is preferred for numerous reasons. For example, the macromonomer polymerization can be readily controlled to produce a desired particle size distribution (preferably narrow, e.g., polydispersity less than 2). Also, for example, additional processing steps, such as isolating the macromonomer as a solid, can be avoided, leading to better process economics. In addition, the macromonomer, macromonomer aqueous emulsion, and the graft copolymer can be prepared by consecutive steps in a single reactor which is desirable in a commercial manufacturing facility because process parameters, such as manufacturing cost and particle size distribution, may be optimized.

The "macromonomer aqueous emulsion" useful in the present invention contains from 20 weight percent to 60 weight percent, and more preferably from 30 weight percent to 50 weight percent of at least one water insoluble macromonomer, based on the total weight of macromonomer aqueous emulsion. The macromonomer aqueous emulsion may also contain mixtures of macromonomer. Preferably, the macromonomer aqueous emulsion contains less than 5 weight percent and more preferably less than 1 weight percent of ethylenically unsaturated monomer, based on the total weight of macromonomer aqueous emulsion.

The water insoluble macromonomer particles have a particle size chosen such that, upon addition of monomers, particles of graft copolymer having a desired particle size will be formed. For example, the final graft copolymer particle size is directly proportional to the initial particle size of the macromonomer and the concentration of second ethylenically unsaturated monomer in the polymerization reaction mixture, assuming all the particles participate equally in the polymerization. Preferably, the macromonomer particles have a weight average particle size of from 50 nm to 500 nm, and more preferably from 80 nm to 200 nm as measured by Capillary Hydrodynamic Fractionation technique using a Matec CHDF 2000 particle size analyzer equipped with a HPLC type Ultra-violet detector.

The macromonomer aqueous emulsion may also include one or more emulsifying agents. The type and amount of emulsifying agent is preferably selected in a manner to produce the desired particle size. Suitable emulsifying agents include those previously disclosed for use in preparing the macromonomer by an emulsion polymerization process. Preferred emulsifying agents are anionic surfactants such as, for example, sodium lauryl sulfate, sodium dodecylbenzene sulfonate, sulfated and ethoxylated derivatives of nonylphenols and fatty alcohols. The total level of emulsifying agent, based on the total weight of macromonomer is preferably from 0.2 weight percent to 5 weight percent and more preferably from 0.5 weight percent to 2 weight percent.

The "monomer composition" useful in the present invention contains at least one kind of ethylenically unsaturated monomer. The monomer composition may contain all (i.e., 100%) monomer, or contain monomer dissolved or dispersed in an organic solvent and/or water. Preferably, the level of monomer in the monomer composition is from 50 weight percent to 100 weight percent, more preferably from 60 to 90 weight percent, and most preferably from 70 to 80 weight percent, based on the total weight of the monomer composition. Examples of organic solvents that may be present in the monomer composition include $C_6$ to $C_{14}$ alkanes. The organic solvent in the monomer composition will be no more than 30 weight percent, and more preferably no more than 5 weight percent, based on the total weight of the monomer composition.

In addition to water and/or organic solvent, the monomer composition may also optionally contain monomers containing functional groups, such as, for example, monomers containing hydroxy, amido, aldehyde, ureido, polyether, glycidylalkyl, keto groups or combinations thereof. These other monomers are generally present in the monomer composition at a level of from 0.5 weight percent to 15 weight percent, and more preferably from 1 weight percent to 3 weight percent based on the total weight of the graft copolymer. Examples of functional monomers include keto-functional monomers such as the acetoacetoxy esters of hydroxyalkyl acrylates and methacrylates (e.g., acetoacetoxyethyl methacrylate) and keto-containing amides (e.g., diacetone acrylamide); allyl alkyl methacrylates or acrylates; glycidylalkyl methacrylates or acrylates; or combinations thereof. Such functional monomer can provide crosslinking if desired.

In a preferred embodiment, the monomers in the monomer composition are pre-emulsified in water to form a "monomer aqueous emulsion". Preferably, the monomer aqueous emulsion contains monomer droplets having a droplet size from 0.05 micron to 100 microns, more preferably from 1 micron to 100 microns, and most preferably from 5 microns to 50 microns. Any suitable emulsifying agent may be used, for example those previously described, to emulsify the monomer to the desired monomer droplet size. Preferably, the level of emulsifying agent, if used, will be from 0.2 weight percent to 2 weight percent based on the total weight of monomer in the monomer composition.

The ethylenically unsaturated monomer of the monomer composition is preferably selected to provide the desired properties in the resulting copolymer (e.g., graft copolymer) composition. Suitable ethylenically unsaturated monomers include for example methacrylate esters, such as $C_1$ to $C_{18}$ normal or branched alkyl esters of methacrylic acid, including methyl methacrylate, ethyl methacrylate, n-butyl methacrylate, 2-ethylhexyl methacrylate, lauryl methacrylate, stearyl methacrylate, isobornyl methacrylate; acrylate esters, such as $C_1$ to $C_{18}$ normal or branched alkyl esters of acrylic acid, including methyl acrylate, ethyl acrylate, n-butyl acrylate and 2-ethylhexyl acrylate; styrene; substituted styrenes, such as methyl styrene, a-methyl styrene or t-butyl styrene; olefinically unsaturated nitriles, such as acrylonitrile or methacrylonitrile; olefinically unsaturated halides, such as vinyl chloride, vinylidene chloride or vinyl fluoride; vinyl esters of organic acids, such as vinyl acetate; N-vinyl compounds such as N-vinyl pyrrolidone; acrylamide; methacrylamide; substituted acrylamides; substituted methacrylamides; hydroxyalkylmethacrylates such as hydroxyethylmethacrylate; hydroxyalkylacrylates; dienes such as 1,3-butadiene and isoprene; vinyl ethers; or combinations thereof. The ethylenically unsaturated monomer can also be an acid containing monomer or a functional monomer, such as those previously described herein. Preferably, the ethylenically unsaturated monomer of the monomer composition does not contain amino groups.

In a preferred embodiment, the monomer composition includes one or more ethylenically unsaturated monomers selected from $C_1$ to $C_{18}$ normal or branched alkyl esters of acrylic acid, including methyl acrylate, ethyl acrylate, n-butyl acrylate and 2-ethylhexyl acrylate; styrene; substituted styrenes, such as methyl styrene, (α-methyl styrene or t-butyl styrene; butadiene or combinations thereof.

As previously mentioned, the macromonomer aqueous emulsion and monomer composition are combined to form a "polymerization reaction mixture", and polymerized in the presence of a free radical initiator to form an "aqueous copolymer composition", also referred to herein as an "aqueous dispersion of a segmental copolymer". The term "polymerization reaction mixture," as used herein, refers to the resulting mixture formed when at least a portion of the macromonomer aqueous emulsion and at least a portion of the monomer composition are combined. The polymerization reaction mixture may also contain initiator or any other additive used during the polymerization. Thus, the polymerization reaction mixture is a mixture that changes in composition as the macromonomer and monomer in the monomer composition are reacted to form graft copolymer.

The macromonomer aqueous emulsion and monomer composition may be combined in various ways to carry out the polymerization. For example, the macromonomer aqueous emulsion and the monomer composition may be combined prior to the start of the polymerization reaction to form the polymerization reaction mixture. Alternatively, the monomer composition could be gradually fed into the macromonomer aqueous emulsion, or the macromonomer aqueous emulsion could be gradually fed into the monomer composition. It is also possible that only a portion of the macromonomer aqueous emulsion and/or monomer composition be combined prior to the start of the polymerization with the remaining monomer composition and/or macromonomer aqueous emulsion being fed during the polymerization.

The initiator can also be added in various ways. For example, the initiator may be added in "one shot" to the macromonomer aqueous emulsion, the monomer composition, or a mixture of the macromonomer aqueous emulsion and the monomer composition at the start of the polymerization. Alternatively, all or a portion of the initiator can be co-fed as a separate feed stream, as part of the macromonomer aqueous emulsion, as part of the monomer composition, or any combination of these methods.

The preferred method of combining the macromonomer aqueous emulsion, the monomer composition, and initiator will depend on such factors as the desired graft copolymer composition. For example, the distribution of the macromonomer as a graft along the backbone can be affected by the concentrations of both the macromonomer and the second ethylenically unsaturated monomers at the time of the polymerization. In this regard, a batch process will afford high concentration of both the macromonomer and the second ethylenically unsaturated monomers at the onset of the polymerization whereas a semi-continuous process will keep the second ethylenically unsaturated monomer concentration low during the polymerization. Thus, through the method by which the macromonomer aqueous emulsion and monomer composition are combined, it is possible to control, for example: the number of graft segments, derived from macromonomer, per polymer chain; the distribution of graft segments in each chain, and the length of the polymer backbone.

Initiators useful in polymerizing the macromonomer and second ethylenically unsaturated monomer include any suitable initiator for emulsion polymerizations known to those skilled in the art. The selection of the initiator will depend on such factors as the initiator's solubility in one or more of the reaction components (e.g. monomer, macromonomer, water); and half life at the desired polymerization temperature (preferably a half life within the range of from about 30 minutes to about 10 hours). Suitable initiators include those previously described herein in connection with forming the macromonomer, such as azo compounds such as 4,4'-azobis(4-cyanovaleric acid), peroxides such as t-butyl hydroperoxide; sodium, potassium, or ammonium persulfate; redox initiator systems such as, for example, persulphate or peroxide in combination with a reducing agent such as sodium metabisulfite, sodium bisulfite, sodium formaldehyde sulfoxylate, isoascorbic acid; or combinations thereof. Metal promoters, such as iron; and buffers, such as sodium bicarbonate, may also be used in combination with the initiator. Additionally, Controlled Free Radical Polymerization (CFRP) methods such as Atom Transfer Radical Polymerization; or Nitroxide Mediated Radical Polymerization may be used. Preferred initiators include azo compounds such as 4,4'-azobis(4-cyanovaleric acid).

The amount of initiator used will depend on such factors as the copolymer desired and the initiator selected. Preferably, from 0.1 weight percent to 1 weight percent initiator is used, based on the total weight of monomer and macromonomer.

The polymerization temperature will depend on the type of initiator chosen and desired polymerization rates. Preferably, however, the macromonomer and second ethylenically unsaturated monomer are polymerized at a temperature of from 0° C. to 150° C., and more preferably from 20° C. to 95° C.

The amount of macromonomer aqueous emulsion and monomer composition added to form the polymerization reaction mixture will depend on such factors as the concentrations of macromonomer and second ethylenically unsaturated monomer in the macromonomer aqueous emulsion and monomer composition, respectively, and the desired graft copolymer composition. Preferably, the macromonomer aqueous emulsion and monomer composition are added in amounts to provide a graft copolymer containing as polymerized units from 2 weight percent to 90 weight percent, more preferably from 5 weight percent to 50 weight percent, and most preferably from 5 weight percent to 45 weight percent macromonomer, and from 10 weight percent to 98 weight percent, more preferably from 50 weight percent to 95 weight percent and most preferably from 55 weight percent to 95 weight percent second ethylenically unsaturated monomer.

One skilled in the art will recognize that other components used in conventional emulsion polymerizations may optionally be used in the method of the present invention. For example, to reduce the molecular weight of the resulting graft copolymer, the polymerization may optionally be conducted in the presence of one or more chain transfer agents, such as n-dodecyl mercaptan, thiophenol; halogen compounds such as bromotrichloromethane; or combinations thereof. Also, additional initiator and/or catalyst may be added to the polymerization reaction mixture at the completion of the polymerization reaction to reduce any residual monomer, (e.g., chasing agents). Suitable initiators or catalysts include those initiators previously described herein. In addition, the chain transfer capacity of a macromonomer through addition-fragmentation can be utilized in part to reduce molecular weight through appropriate design of monomer compositions and polymerization conditions. See e.g., E. Rizzardo, et. al., Prog. Pacific Polym. Sci., 1991, 1, 77–88; G. Moad, et. al., WO 96/15157.

Preferably, the process of the present invention does not require neutralization of the monomer, or resulting aqueous graft copolymer composition. These components preferably remain in unneutralized form (e.g., no neutralization with a base if acid functional groups are present).

The resulting aqueous comb copolymer composition formed by polymerization of the macromonomer and the ethylenically unsaturated monomer in the monomer composition preferably has a solids level of from 30 weight percent to 70 weight percent and more preferably from 40 weight percent to 60 weight percent. The aqueous comb copolymer composition contains comb copolymer particles preferably having a weight average particle size of from 50 nm to 1,000 nm, more preferably from 60 nm to 500 nm, and most preferably from 80 nm to 200 nm.

The graft copolymer formed preferably has a backbone containing, as polymerized units, the second ethylenically unsaturated monomer from the monomer composition, and one or more macromonomer units, as polymerized units, wherein a terminal ethylenically unsaturated group of the macromonomer is incorporated into the backbone and the remainder of the macromonomer becomes a graft segment pendant to the backbone (i.e., a side chain) upon polymerization. Preferably, each side chain is a graft segment derived from the grafting of one macromonomer to the backbone.

The degree of polymerization of the graft segments derived from the macromonomer is preferably from 5 to 1,000, preferably from 10 to 1,000, more preferably 10 to 200, and most preferably from 20 to less than 50, where the degree of polymerization is expressed as the number of polymerized units of ethylenically unsaturated monomer used to form the macromonomer. The weight average molecular weight of the graft copolymer (e.g., of the comb copolymer) is preferably in the range of from 50,000 to 2,000,000, and more preferably from 100,000 to 1,000,000. Weight average molecular weights as used herein can be determined by size exclusion chromatography.

The graft copolymer particles of the aqueous graft copolymer composition can be isolated, for example, by spray drying or coagulation, followed by forming a coating by powder coating methods, or by redispersing in an aqueous medium. However, it is preferable to use the aqueous copolymer composition (i.e., the aqueous dispersion of segmental copolymer) without an intermediate isolation step to form a film.

In a preferred embodiment of the present invention, the polymerization is conducted in two stages. In the first stage, the macromonomer is formed in an aqueous emulsion polymerization process, and in the second stage the macromonomer is polymerized with the second ethylenically unsaturated monomer in an emulsion. For efficiency, preferably these two stages are conducted in a single vessel. For example, in the first stage, the macromonomer aqueous emulsion may be formed by polymerizing in an aqueous emulsion at least one first ethylenically unsaturated monomer to form water insoluble macromonomer particles. This first stage polymerization is preferably conducted using a transition metal chelate chain transfer agent as previously described herein. After forming the macromonomer aqueous emulsion, a second emulsion polymerization is preferably performed in the same vessel to polymerize the macromonomer with at least one second ethylenically unsaturated monomer. This second stage may be conducted for example by directly adding (e.g., all at once or by a gradual feed) the monomer composition and initiator to the macromonomer aqueous emulsion. One main advantage of this embodiment is that the macromonomer does not have to be isolated, and the second polymerization can take place simply by adding the monomer composition and initiator to the macromonomer aqueous emulsion. In this preferred embodiment, the particle size and particle size distribution of the plural water insoluble macromonomer particles may be precisely controlled, and later addition of more macromonomer aqueous emulsion would typically not be required, except when, for example, a second mode (particle size and/or composition) of graft copolymer is desired.

In another preferred embodiment of the present invention, the polymerization of the macromonomer and second ethylenically unsaturated monomer is at least partially performed in the presence of an acid containing monomer, acid containing macromonomer, or combinations thereof. The acid containing monomer or acid containing macromonomer may be added in any manner to the polymerization reaction mixture. Preferably, the acid containing monomer or acid containing macromonomer is present in the monomer composition. The acid containing monomer or acid containing macromonomer may also be added as a separate stream to the polymerization reaction mixture.

The amount of acid containing monomer or acid containing macromonomer added to the polymerization reaction mixture is preferably from 0.2 weight percent to 10 weight percent, more preferably from 0.5 weight percent to 5 weight percent, and most preferably from 1 weight percent to 2 weight percent, based on the total weight of monomer and macromonomer added to the polymerization reaction mixture.

Acid containing monomers which may be used in this embodiment include ethylenically unsaturated monomers bearing acid functional or acid forming groups such as those previously described herein. The "acid containing macromonomer" useful in this embodiment is any low molecular weight polymer having at least one terminal ethylenically unsaturated group that is capable of being polymerized in a free radical polymerization process, and that is formed from at least one kind of acid containing monomer. Preferably, the amount of acid containing monomer present, as polymerized units, in the acid containing macromonomer is from 50 weight percent to 100 weight percent, more preferably from 90 weight percent to 100 weight percent, and most preferably from 95 weight percent to 100 weight percent.

The acid containing macromonomer may be prepared according to any technique known to those skilled in the art such as those previously described herein. In a preferred embodiment of the present invention, the acid containing macromonomer is prepared by a solution polymerization process using a free radical initiator and transition metal chelate complex. Such a process is disclosed in, for example, U.S. Pat. No. 5,721,330. Preferred acid containing monomers used to form the acid containing macromonomer are α-methyl vinyl monomers such as methacrylic acid.

In another preferred embodiment of the present invention, a "macromolecular organic compound" having a hydrophobic cavity is present in the polymerization medium used to form the macromonomer and/or aqueous copolymer composition. Although the macromolecular organic compound may be used to facilitate transport of any ethylenically unsaturated monomer through the aqueous phase of the polymerization reaction mixture, preferably, the macromolecular organic compound is used when copolymerizing ethylenically unsaturated monomers with a water solubility of no greater than 150 millimoles/liter, more preferably no greater than 50 millimoles/liter. Herein, a water solubility at 25° C. to 50° C. of no greater than 50 millimoles/liter is referred to as "very low water solubility". Ethylenically unsaturated monomers having very low water solubility include, for example, lauryl (meth)acrylate and stearyl (meth)acrylate. The macromolecular organic compound may, for example, be added to the monomer composition, the macromonomer aqueous emulsion, or the polymerization reaction mixture used to form the aqueous copolymer composition. Also, for example, the macromolecular organic compound may be added to an aqueous emulsion of ethylenically unsaturated monomer used to form the macromonomer. Suitable techniques for using a macromolecular organic compound having a hydrophobic cavity are disclosed in, for example, U.S. Pat. No. 5,521,266.

Preferably, the macromolecular organic compound having a hydrophobic cavity is added to the polymerization reaction mixture to provide a molar ratio of macromolecular organic compound to very low water solubility monomer or macromonomer of from 5:1 to 1:5000 and more preferably from 1:1 to 1:500.

Macromolecular organic compounds having a hydrophobic cavity useful in the present invention include for example cyclodextrin or cyclodextrin derivatives; cyclic oligosaccharides having a hydrophobic cavity such as cycloinulohexose, cycloinuloheptose, or cycloinuloctose; calyxarenes; cavitands; or combinations thereof. Preferably, the macromolecular organic compound is β-cyclodextrin, more preferably methyl-β-cyclodextrin.

Monomers having low water solubility include for example primary alkenes; styrene and alkylsubstituted styrene; α-methyl styrene; vinyltoluene; vinyl esters of $C_4$ to $C_{30}$ carboxylic acids, such as vinyl 2-ethylhexanoate, vinyl neodecanoate; vinyl chloride; vinylidene chloride; N-alkyl substituted (meth)acrylamide such as octyl acrylamide and maleic acid amide; vinyl alkyl or aryl ethers with ($C_3$–$C_{30}$) alkyl groups such as stearyl vinyl ether; ($C_1$–$C_{30}$) alkyl esters of (meth)acrylic acid, such as methyl methacrylate, ethyl (meth)acrylate, butyl (meth)acrylate, 2-ethylhexyl (meth)acrylate, benzyl (meth)acrylate, lauryl (meth) acrylate, oleyl (meth)acrylate, palmityl (meth)acrylate, stearyl (meth)acrylate; unsaturated vinyl esters of (meth) acrylic acid such as those derived from fatty acids and fatty alcohols; multifunctional monomers such as pentaerythritol triacrylate; monomers derived from cholesterol or combinations thereof.

In another aspect of the present invention an "aqueous copolymer composition" is provided that is preferably produced by the method of the present invention as previously described herein. The aqueous copolymer composition contains a plurality of water insoluble particles of graft copolymer that are preferably comb copolymer particles. The comb copolymer particles preferably have a weight average particle size of from 50 nm to 1,000 nm, more preferably from 60 nm to 500 nm, and most preferably from 80 nm to 200 nm.

Preferably, the particles of graft copolymer contain from 2 weight percent to 90 weight percent, and more preferably from 5 weight percent to 50 weight percent polymerized units of a macromonomer, based on the total weight of the copolymer, where the macromonomer preferably has a composition as previously described herein for the water insoluble macromonomer present in the macromonomer aqueous emulsion. The graft copolymer particles also preferably contain from 10 weight percent to 98 weight percent, and more preferably from 50 weight percent to 95 weight percent polymerized units of at least one second ethylenically unsaturated monomer, based on the total weight of the copolymer. The ethylenically unsaturated monomer may be any ethylenically unsaturated monomer that provides desirable properties in the copolymer particles, such as those useful in the monomer composition as previously described herein.

Preferably, the backbone of the graft copolymer is linear. Compositionally, the backbone of the copolymer preferably contains polymerized units of the scond ethylenically unsaturated monomer derived from the monomer composition. Preferably, the backbone contains less than 20 mole percent, and more preferably less than 10 mole percent of polymerized macromonomer derived from the macromonomer aqueous emulsion, based on the total moles of monomer, as polymerized units, in the copolymer. Preferably, the Tg of the backbone is from –90° C. to 50° C., more preferably –80° C. to 25° C., and most preferably –60° C. to 0° C. The pendant graft segments of the graft copolymer preferably contain polymerized units of the macromonomer. The carbon atoms of the double bond of the macromonomer, and other atoms such a hydrogen and groups such as methyl directly attached to those carbon atoms, become, as a polymerized unit, part of the backbone of the graft copolymer, while the remainder of the macromonomer becomes a graft segment of the graft copolymer. In a preferred embodiment of the present invention, each graft segment is derived from one macromonomer. The graft segment contains as polymerized units less than 10 weight percent, preferably less than 5 weight percent, more preferably less than 2 weight percent and most preferably less than 1 weight percent acid containing monomer, based on the weight of the macromonomer from which it was derived. In a most preferred embodiment, the graft segment contains no acid containing monomer. Further, the graft segment may be free of non-methacrylate monomer, but typically contains, as polymerized units, at least one molecule of non-methacrylate monomer, preferably 5 weight percent to 50 weight percent non-methacrylate monomer, more preferably 10 weight percent to 35 weight percent non-methacrylate monomer, and most preferably 15 weight percent to 25 weight percent of non-methacrylate monomer, based on the weight of the macromonomer from which it was derived. Additionally, the pendant graft segments contain less than 5 weight percent and more preferably less than 1 weight percent of the polymerized second ethylenically unsaturated monomer derived from the monomer composition, based on the total weight of the pendant graft segments.

Preferably, the Tg of the graft segment is from 30° C. to 130° C., more preferably from 40° C. to 120° C., and most preferably from 50° C. to 105° C.

Preferably, the graft segment is present in the graft copolymer at from 1 weight percent to 70 weight percent, more preferably 2 to 45 weight percent, and most preferably 5 to 35 weight percent, based on the weight of the comb copolymer, where the weight of the graft segment is taken as the weight of the macromonomer from which the graft segment was derived.

Preferably, the overall weight average molecular weight of the graft copolymer is from 50,000 to 2,000,000, and more preferably from 100,000 to 1,000,000.

In a preferred embodiment of the present invention, the water insoluble graft copolymer particles further contain from 0.2 weight percent to 10 weight percent, more preferably from 0.5 weight percent to 5 weight percent, and most preferably from 1 weight percent to 2 weight percent of an acid containing macromonomer, based on the total weight of the graft copolymer. The acid containing macromonomer preferably has a composition as previously described herein.

Although in no way intending to be bound by theory, it is believed that the "acid containing macromonomer" is attached to the surface of the water insoluble graft copolymer particles and provides stability. By "attached," as used herein, it is believed that the acid containing macromonomer is bound in some manner (e.g., covalent, hydrogen bonding, ionic) to a polymer chain in the particle. Preferably, the acid containing macromonomer is covalently bound to a polymer chain in the particle. The acid containing macromonomer is most effective when present at the surface of the graft copolymer particle. As such, it is not necessary that even one acid containing macromonomer unit be incorporated into every graft compolymer. In fact, it is preferable that, when units of acid containing macromonomer are attached to chains of graft copolymer, those chains are at the surface of the graft copolymer particles. It has been found that the acid containing macromonomer provides stability to the particles such that the aqueous copolymer composition produced exhibits unexpected improved shear stability; freeze thaw stability; and stability to additives in formulations, as well as reduction of coagulum during the polymerization. Although improved stability can be achieved using acid containing monomer, these benefits are most dramatic when an acid containing macromonomer is used.

The aqueous copolymer composition in addition to the copolymer particles preferably contains less than 10 weight percent, and more preferably less than 1 weight percent of organic solvent, based on the weight of copolymer particles. In a most preferred embodiment, the aqueous copolymer composition contains no organic solvent.

An advantage of using the method of the present invention to prepare the aqueous copolymer composition is that the resulting copolymer composition contains low levels of homopolymer, such as for example homopolymer of second ethylenically unsaturated monomer derived from the monomer composition or homopolymer of macromonomer derived from the macromonomer aqueous emulsion. Preferably the aqueous copolymer composition contains less than 30 weight percent and more preferably less than 20 weight percent of homopolymer of macromonomer, based on the total weight of the graft copolymer. Preferably also the aqueous copolymer composition contains less than 30 weight percent and more preferably less than 20 weight percent of homopolymer of ethylenically unsaturated monomer.

The aqueous dispersion of the present invention may include a coalescent. The coalescent of the present invention may be any coalescent known to the art. For example, many common solvents are use in the art as coalescents. It is preferred that the coalescent is present in the amount of from 0 weight percent to 40 weight percent, more preferably 0 weight percent to 20 weight percent, and most preferably 0 weight percent to 5 weight percent, based on the weight of the comb copolymer. In a most preferred embodiment, the aqueous coating composition contains no coalescent. The aqueous dispersion of the present invention may further contain an emulsion polymer not meeting the limitations of the segmental copolymer of the present invention, including a film-forming and/or a non-film-forming emulsion polymer. This emulsion polymer may be introduced by blending or in-situ polymerization. When included in the aqueous dispersion, the emulsion polymer not meeting the limitations of the comb copolymer of the present invention is preferably present in an amount of from 1 weight percent to 99 weight percent, more preferably 5 weight percent to 95 weight percent, and most preferably 10 weight percent to 90 weight percent, based on the combined weight of the comb copolymer and the emulsion polymer not meeting the limitations of the comb copolymer of the present invention.

The aqueous copolymer compositions produced by the method of the present invention are useful in a variety of applications. For example, the aqueous copolymer compositions may be used in architectural and industrial coatings including paints, wood coatings, or inks; paper coatings; textile and nonwoven binders and finishes; adhesives; mastics; asphalt additives; floor polishes; leather coatings; plastics; plastic additives; petroleum additives; thermoplastic elastomers or combinations thereof.

When the aqueous copolymer compositions of the present invention are used as coatings compositions, it is often desirable to have additional components added to the coating composition to form the final formulation for coating compositions, including traffic paints, described herein. These additional components include, for example, thickeners; rheology modifiers; dyes; sequestering agents; biocides; dispersants; pigments, such as, titanium dioxide, organic pigments, carbon black; extenders, such as calcium carbonate, talc, clays, silicas and silicates; fillers, such as glass or polymeric microspheres, quartz and sand; anti-freeze agents; plasticizers; adhesion promoters such as silanes; coalescents; wetting agents; surfactants; slip additives; crosslinking agents; defoamers; colorants; tackifiers; waxes; preservatives; freeze/thaw protectors; corrosion inhibitors; and anti-flocculants. During application of the aqueous coating composition of the present invention to the surface of a substrate, glass or polymeric microspheres, quartz and sand may be added as part of the that coating composition or as a separate component applied to the surface in a separate step simultaneously with, before, or after the step of application of the aqueous coating composition.

The aqueous copolymer compositions produced by the method of the present invention are useful in a variety of applications. For example, the aqueous copolymer compositions may be used in architectural and industrial coatings including paints, wood coatings, or inks; paper coatings; textile and nonwoven binders and finishes; adhesives; mastics; floor polishes; leather coatings; plastics; plastic additives; petroleum additives; thermoplastic elastomers or combinations thereof.

Experimental Section

EXAMPLES

Some embodiments of the invention will now be described in detail in the following Examples. The following abbreviations shown in Table 1 are used in the examples:

Table 1: Abbreviations

| Abbreviation | |
|---|---|
| A-16-22 | Polystep A-16-22, anionic surfactant, supplied as 22% solids by Stepan Company, located in Northfield, Illinois. |
| EA | Ethyl acrylate |
| BA | Butyl acrylate |
| MMA | Methyl methacrylate |
| BMA | Butyl methacrylate |
| MAA | Methacrylic acid |
| CoBF | Co(II)-(2,3-dioxyiminobutane-BF$_2$)$_2$ |
| CVA | 4,4-azobis(4-cyanovaleric acid) |
| GC | Gas chromatograph |
| SEC | Size exclusion chromatography |
| HPLC | High performance liquid chromatography |
| Init. | Initiator |
| IR | Infrared spectroscopy |
| NaPS | Sodium persulfate |
| Na$_2$CO$_3$ | Sodium bicarbonate |
| Mn | Number average molecular weight |
| Mw | Weight average molecular weight |
| MM | Macromonomer |
| PMAA-MM | Poly-methacrylic acid macromonomer |
| MM | Macromonomer |
| PMMA-MM | Poly-methyl methacrylate macromonomer |
| Wako VA-044 | 2,2'-azobis[2-(2-imidazolin2-2yl)propane]dihydrochloride |

In the Examples, monomer conversion was determined by GC analysis of unreacted monomer using standard methods. Weight percent solids for the macromonomer and copolymers were determined by gravimetric analysis. Particle size of the macromonomer and copolymer compositions were obtained using a Matec CHDF 2000 particle size analyzer equipped with a HPLC type ultra-violet detector.

GPC, Gel Permeation Chromatography, otherwise known as SEC, Size Exclusion Chromatography, separates the members of a distribution of polymer chains according to their hydrodynamic size in solution rather than their molar mass. The system is then calibrated with standards of known molecular weight and composition to correlate elution time with molecular weight. The techniques of GPC are discussed in detail in *Modern Size Exclusion Chromatography*, W. W. Yau, J. J Kirkland, D. D. Bly; Wiley-Interscience, 1979, and in *A Guide to Materials Characterization and Chemical Analysis*, J. P. Sibilia; VCH, 1988, p.81–84.

Macromonomer was measured for number average molecular weight by SEC using a polystyrene standard from Polymer Laboratories (PS-1) having a peak average molecular weight ranging from 580 to 7,500,000 with narrow molecular weight distribution. Conversions from polystyrene to PMMA were made using Mark-Houwink constants. Copolymer compositions were evaluated for number average molecular weight and weight average molecular weight using SEC as follow: the sample is dissolved in THF at a concentration of approximately 0.1% weight sample per volume THF, followed by filtration through a 0.45 μm PTFE (polytetrafluoroethylene) membrane filter. The analysis is performed by injecting 100 μl of the above solution onto 3 columns connected in sequence and held at 40° C. The three columns are: one each of PL Gel 5 100, PL Gel 5 1,000, and PL Gel 5 10,000, all available from Polymer Labs, Amherst, Mass. The mobile phase used is THF flowing at 1 ml/min. Detection is carried out by the use of ELSD (Evaporative Light Scattering Detector). The system was calibrated with narrow polystyrene standards. PMMA-equivalent molecular weights for the sample are calculated via Mark-Houwink correction using K=14.1×10$^{-3}$ ml/g and ?=0.70 for the complete dissolution of the surfactant, the initiator (CVA) was added to the water surfactant solution with stirring for 2 minute to permit the initiator to dissolve. After dissolution of the initiator, MMA (245 g for example 1.1 and 63 g for examples 1.2 to 1.6, respectively) was introduced into the reaction flask and allowed to react for 10 minutes. At the end of 10 minutes, 20 percent by weight of the monomer solution was added to the reaction flask with stirring. Following this initial charge, the remaining monomer solution was fed over a period of 2 hours, with stirring, to form a reaction mixture. At the end of the feed period, the reaction mixture was maintained at 80° C. for an additional 2 hours. The reaction mixture was then cooled to room temperature and passed through a filter cloth to remove any coagulum.

Generally, the resulting macromonomer emulsion contained less than 5 weight percent coagulum based on the total weight of macromonomer, and the conversion of monomer was over 99 weight percent, based on the total weight of monomer added. The Mn, weight percent solids and particle size for each macromonomer are reported in Table 2.

TABLE 2

Preparation of Macromonomers (MM)

| Ex. | H$_2$O (g) | Surf. (g)[3] | MMA (g) | BMA | EA | MAA | CTA g[1] | Init. g[2] | Part. Size (nm) | Mn | Wt % Solids |
|---|---|---|---|---|---|---|---|---|---|---|---|
| 1.1 | 9256 | 214 | 4,655 | — | — | — | 0.29 | 49 | 84 | 11210 | 34.0 |
| 1.2 | 2380 | 54.8 | 838 | — | 299.4 | 59.8 | 0.16 | 12.6 | 100 | 9470 | 33.0 |
| 1.3 | 2300 | 51 | 928.8 | 185.8 | — | — | 0.08 | 11.8 | 99 | 14050 | 33.2 |
| 1.4 | 2380 | 54.8 | 838 | — | 299.4 | 59.8 | 0.16 | 12.6 | 81 | 10410 | 33.4 |
| 1.5 | 2380 | 55 | 1,160 | — | — | — | 0.20 | 12.6 | 100 | 3770 | 32.7 |
| 1.6 | 2380 | 55 | 1,197 | — | — | — | 0.07 | 12.6 | 62 | 8010 | 33.7 |
| 1.7[4] | 2300 | 51 | 710 | — | 250 | 40 | 0.16 | 12.6 | 90 | 10000 | 30 |
| 1.8[4] | 2300 | 51 | 730 | — | 250 | 20 | 0.16 | 12.6 | 90 | 10000 | 30 |
| 1.9[4] | 2300 | 51 | 750 | — | 250 | — | 0.16 | 12.6 | 90 | 10000 | 30 |

[1]Chain Transfer Agent (CoBF)
[2]CVA, supplied by Aldrich as a 75 weight percent aqueous solution of initiator.
[3]A-16-22.
[4]The values listed for Examples 1.7–1.9 are the values one would use in preparation of the corresponding macromonomers.

polystyrene standards and K=10.4×10$^{-3}$ ml/g and ?=0.697 for the sample.

Examples 1.1 to 1.9

Preparation of Macromonomers by Emulsion Polymerization

"Macromonomer" ("MM") was prepared by emulsion polymerization processes in Examples 1.1 to 1.6. The polymerization was conducted in a 5-liter, four neck round bottom reaction flask equipped with a mechanical stirrer, temperature control device, condenser, monomer feed line and a nitrogen inlet except for example 1.1 which was prepared in a 5 gallon reactor with similar attachments. The specific amounts of water, surfactant, monomers, chain transfer agent (CTA), and initiator used in Examples 1.1 to 1.6 are shown in Table 2. These ingredients were added according to the following procedure. In a different flask from the reaction flask, a monomer solution was prepared by dissolving the chain transfer agent in the monomer mixture consisting of all the monomers listed in Table 2 under a nitrogen purge. Deionized water and surfactant were introduced into the reaction flask at room temperature to form a water surfactant solution. The water surfactant solution was mixed and heated to 80° C. with stirring under a nitrogen purge. Upon reaching a temperature of 80° C., and upon Example 2

Preparation of PMAA-MM by Solution Polymerization

"MAA macromonomer" ("PMAA-MM") was prepared by aqueous solution polymerization in a 2-liter baffled flange flask equipped with a mechanical stirrer, condenser, temperature control device, initiator feed lines and a nitrogen inlet. The apparatus was purged with nitrogen for 30 minutes after 0.018 g of CoBF was added. Deionized water, 1080 g, was charged to the flask and heated to 55° C. under a nitrogen purge. A monomer mixture containing 510 ml of MAA and 0.01 g of CoBF was prepared separately under nitrogen. When the deionized water reached a temperature of 55° C., 1.94 g of initiator (Wako VA-044) was added to the reaction flask. Following the addition of the initiator, the monomer mixture was added over a period of 60 minutes to the reaction flask with stirring. The temperature was then held at 55° C. for 2 hours following completion of the monomer mixture feed. Upon cooling the reaction flask to room temperature, the MAA-MM (Example 2.1) was isolated as dried polymer by rotary evaporation. The number average molecular weight (Mn) of the MAA-MM was determined by proton nuclear magnetic resonance to be 4030 based on the integration of the vinyl end group with respect to the methyl and methylene groups of the polymer chain.

Example 3
Preparation of Acrylic Graft Copolymers by Semi-Continuous Emulsion Polymerization In Examples 3.1 to 3.9 and 3.13 to 3.15, graft copolymers were prepared by a semi-continuous emulsion polymerization process in a 5-liter round bottom flask with four neck equipped with a mechanical stirrer, temperature control device, initiator feed lines and a nitrogen inlet. The specific amounts of Macromonomer (MM, as emulsion), water, surfactant, monomers, acid containing monomers, and initiator used in Examples 3.1 to 3.9 and 3.13 to 3.15 are shown in Table 3. These ingredients were added according to the following procedure. A monomer emulsion of deionized water ($H_2O$ #2 in Table 3), surfactant, and monomers (as listed in Table 3) was prepared in a separate flask. Deionized water ($H_2O$ #1 in Table 3), MM from the example indicated in Table 2 and 20% of the monomer emulsion were introduced into the reaction flask at room temperature to form a reaction mixture. The reaction mixture was heated to 85° C. while stirring under a nitrogen purge. Upon reaching 85° C., the initiator and buffer solutions were introduced into the reaction flask. The remaining monomer emulsion was added over a period of 30 minutes with the temperature maintained at 90° C. Upon completion of the feeds, the reaction mixture was maintained at the reaction temperature for a period of 1 hours. The resulting copolymer composition was analyzed for conversion and other properties (Table 5). The conversion of BA and styrene, determined by standard GC methods, was greater than 99 weight percent based on the total weight of monomer charged.

Example 4
Preparation of Comparative Examples

In Examples C-4.1 to C-4.6, random copolymers were prepared by semi-continuous emulsion polymerization in a 5-liter round bottom flask with four neck equipped with a mechanical stirrer, temperature control device, initiator feed lines and a nitrogen inlet. The specific amounts of water, surfactant, monomers used in Examples C-4.1 to C-4.6 are shown in Table 4. These ingredients were added according to the following procedure. A monomer emulsion of deionized water ($H_2O$ #2 in Table 4), surfactant (Surf. #2 in Table 4), and monomers (as listed in Table 4) was prepared in a separate flask. Deionized water ($H_2O$ #1 in Table 4), and surfactant (Surf. #1, except for C-4.6) were introduced into the reaction flask at room temperature to form a reaction mixture. The reaction mixture was heated to the 85° C. while stirring under a nitrogen purge. Upon reaching 85° C., an initiator solution (5.3 g of NaPS except for C-4.6 with 0.54 g, in 30 g of water) and a buffer solution (5.3 g of $Na_2CO_3$ except for C-4.6 with 1.21 g, in 30 g of water) were introduced into the reaction flask with stirring. The monomer emulsion was fed to the reaction mixture over a period of 3 hours together with an initiator solution (0.8 g NaPS except for C-4.6 with 1.2 g, in 210 g of water). Upon completion of the feeds, the reaction mixture was maintained at the reaction temperature for 20 minutes.

TABLE 3

Preparation of Acrylic Graft Copolymers by Semi-Continuous Emulsion Polymerization.

| Ex. | MM[1] Ex Amt. | MM (g) | $H_2O$ #1 (g) | $H_2O$ #2 (g) | Surf.[2] (g) | BA (g) | Sty. (g) | Acid (g)[5] | Init.[3] (g) | Buffer[4] (g) |
|---|---|---|---|---|---|---|---|---|---|---|
| 3.1 | 1.4 | 919 | 200 | 101 | 14.9 | 445.4 | 111 | 12.7 | 0.6 | 0.6 |
| 3.2 | 1.5 | 892 | 380 | 200 | 28.2 | 1059 | — | 25.2 | 1.2 | 1.2 |
| 3.3 | 1.5 | 1783 | 380 | 200 | 28.2 | 1059 | — | 25.2 | 1.2 | 1.2 |
| 3.4 | 1.1 | 1806 | 546 | 203 | 29.7 | 1115 | — | 26.5 | 1.2 | 1.2 |
| 3.5 | 1.3 | 1915 | 340 | 420 | 30.8 | 1156 | — | 27.4 | 1.3 | 1.3 |
| 3.6 | 1.6 | 521 | 800 | 600 | 34 | 1554 | — | 20.5 | 1.2 | 1.2 |
| 3.7 | 1.1 | 2433 | 100 | 420 | 30.8 | 1011 | — | 27.4 | 1.3 | 1.3 |
| 3.8 | 1.2 | 1462 | 400 | 300 | 29.7 | 809.5 | 436 | 26.3 | 1.2 | 1.2 |
| 3.9 | 1.2 | 1051 | 400 | 500 | 29.7 | 895 | 482 | 26.3 | 1.2 | 1.2 |
| 3.10[6] | 1.7 | 1500 | 400 | 200 | 30 | 653.5 | 163 | 19.2 | 1.2 | 1.2 |
| 3.11[6] | 1.8 | 1500 | 400 | 200 | 30 | 653.5 | 163 | 19.2 | 1.2 | 1.2 |
| 3.12[6] | 1.9 | 1500 | 400 | 200 | 30 | 653.5 | 163 | 19.2 | 1.2 | 1.2 |
| 3.13 | 1.1 | 541 | 500 | 950 | 30.8 | 1627 | — | 27.6 | 1.3 | 1.3 |
| 3.14 | 1.1 | 108 | 1000 | 750 | 30.8 | 1774 | — | 27.6 | 1.3 | 1.3 |
| 3.15 | 1.1 | 1081 | 525 | 800 | 30.8 | 1443 | — | 27.4 | 1.3 | 1.3 |

[1] Macromonomer emulsion prepared by method of Example 1.
[2] Ethoxylated $C_6$ to $C_{18}$ alkyl ether sulfate having from 1 to 40 ethylene oxide groups per molecule (30% active in water).
[3] NaPS dissolved in 10 g of water.
[4] Sodium carbonate dissolved in 15 g of water.
[5] PMAA-MM (prepared by method of Example 2.1)
[6] The values listed for Examples 3.10–3.12 are the values one would use in preparation of the corresponding acrylic graft copolymers (i.e., comb copolymer).

TABLE 4

Preparation of comparative examples

| Comp. Ex. | H₂O #1 (g) | H₂O #2 (g) | Surf. #1[1] (g) | Surf. #2[2] (g) | EA (g) | BA (g) | MMA (g) | BMA (g) | Sty. (g) | MMA (g) | PMAA-mm[2] (g) |
|---|---|---|---|---|---|---|---|---|---|---|---|
| C-4.1 | 400 | 525 | 22.3 | 14.6 | 130.5 | 750 | 361.5 | — | 187.5 | 48 | 22.5 |
| C-4.2 | 400 | 525 | 22.3 | 14.6 | — | 852.5 | 420 | 105 | — | — | 22.5 |
| C-4.3 | 400 | 675 | 22.3 | 14.6 | — | 795 | 679.5 | — | — | 25.5 | — |
| C-4.4 | 400 | 525 | 22.3 | 14.6 | 103.5 | 690 | 289.5 | — | 373.5 | 21 | 22.5 |
| C-4.5 | 400 | 525 | 22.3 | 14.6 | 75 | 765 | 210 | — | 412.5 | 15 | 22.5 |
| C-4.6 | 1395 | 397 | [3] | 19.4 | — | 1116.8 | 615.6 | — | — | — | 26.3 |
| C-4.7 | 400 | 525 | 22.3 | 14.6 | 130.5 | 750 | 371.1 | — | 187.5 | 38.4 | 22.5 |
| C-4.8 | 400 | 525 | 22.3 | 14.6 | 130.5 | 750 | 390.3 | — | 187.5 | 19.2 | 22.5 |
| C-4.9 | 400 | 525 | 22.3 | 14.6 | 130.5 | 750 | 409.5 | — | 187.5 | — | 22.5 |

[1] Ethoxylated $C_6$ to $C_{18}$ alkyl ether sulfate having from 1 to 40 ethylene oxide groups per molecule (30% active in water).
[2] PMAA-MM (prepared by method of Example 2.1)
[3] 15 g of an acrylic latex seed polymer at 30% solids and particle size of 90 nm was used.
[6] The values listed for Examples C-4.7 to C-4.9 are the values one would use in preparation of the corresponding acrylic copolymers.

Graft and Random copolymer compositions prepared in the previous examples were characterized by various analytical techniques to determine wt % solids, particle size, weight average molecular weight, number average molecular weight, and percent incorporation of macromonomer.

Determination of the amount of unreacted macromonomer was carried out by HPLC analysis using the following procedure. The copolymer compositions were dissolved in THF and analyzed by gradient elution on an LC-18 column supplied by Supelco, located in Bellefonte, Pa. such that a well-isolated peak was observed for the unreacted macromonomer. Quantification was carried out by calibrating the detector response using known standards of the same macromonomer employed in the synthesis. The results of the characterization are reported in Table 5 below.

TABLE 5

Characterization Of Copolymer Compositions

| Ex. | % Solids | Particle Size (nm) | Mw (× 10⁻³) | Mn (× 10⁻³) | PMMA-MM Incorp.[1] (wt %) |
|---|---|---|---|---|---|
| 3.1 | 44.5 | 117 | 366.5 | 67.7 | 90 |
| 3.2 | 44.9 | 150 | 645 | 254.4 | 99 |
| 3.3 | 42.8 | 132 | 921.3 | 145.4 | 99 |
| 3.4 | 45.5 | 106 | 501.7 | 95.9 | 87 |
| 3.5 | 44.7 | 124 | 631.7 | 199.2 | 95 |
| 3.6 | 45.9 | 171 | 566 | 141.4 | 95 |
| 3.7 | 45.2 | 105 | 815.7 | 132.4 | 90 |
| 3.8 | 43.9 | 109 | 610 | 147.6 | 84 |
| 3.9 | 46.4 | 113 | 714.7 | 196.2 | 82 |
| 3.10[2] | 44 | 150 | 500 | 150 | 90 |
| 3.11[2] | 44 | 150 | 500 | 150 | 90 |
| 3.12[2] | 44 | 150 | 500 | 150 | 90 |
| 3.13 | 45.6 | 144 | 337.6 | 22.1 | 89 |
| 3.14 | 45.3 | 171 | 340.4 | 18.7 | — |
| 3.15 | 45.8 | 119 | 229 | 108 | 91 |
| C-4.1 | 45.3 | 96 | 91.6 | 3.1 | — |
| C-4.2 | 37.5 | 99 | 146.7 | 21.7 | — |
| C-4.3 | 47.3 | 103 | 148.0 | 27.5 | — |
| C-4.4 | 46.6 | 93 | 88.7 | 3.3 | — |
| C-4.5 | 45.4 | 107 | 299.3 | 51.9 | — |
| C-4.6 | 43.7 | 254 | 116.8 | 488.1 | — |
| C-4.7[2] | 44 | 100 | 150 | 50 | — |
| C-4.8[2] | 44 | 100 | 150 | 50 | — |
| C-4.9[2] | 44 | 100 | 150 | 50 | — |

[1] Based on the total weight of macromonomer added to reaction vessel.
[2] The values listed for Examples 3.10–3.12 and C-4.7 through C-4.9 are the values one would expect in the polymer products.

Example 5
Preparation of a Soft-Hard Elastormeric (SHE) Polymer (C-5.1)

The polymer was prepared by a three-stage polymerization process similar to that described in U.S. Pat. No. 6,060,532. The first stage was conducted by semi-continuous emulsion polymerization in a 4-neck 5-liter round-bottom flask equipped with a mechanical stirrer, temperature control device, initiator feed lines and a nitrogen inlet. Deionized water (704 g) was charged to the reaction flask and heated to 92° C. A monomer emulsion containing 366 g of deionized water, 7.4 g of surfactant (A-16–22), 1370 g of BA and 20 g of acrylic acid was prepared in a separate flask. When the deionized water had reached 92° C., an initiator solution (1.77 g of Ammonium Persulfate in 26 g of water) and 67.2 g of a polymer seed (acrylic latex with total solid content of 45% and particle size of 90 nm) were introduced into the reaction flask with stirring. The monomer emulsion was fed to the reaction mixture over a period of about 2 hours, together with a initiator solution containing 1.77 g of APS in 78 g of water. The polymerization temperature was maintain at 85° C. Upon completion of the feeds, the reaction mixture was cooled to 60° C. Aqueous ammonium hydroxide (14% by weight) was added during the cooling followed by 4.1 g of an $Fe_2SO_4$ solution (0.2%). At 60° C., 3.8 g of t-butyl hydroperoxide (70%) in 46 g of water and 2.45 g of Sodium sulfoxylate formaldehyde in 46 g of water were added over a period of 45 minutes.

A second monomer emulsion containing 102 g of water, 1.85 g of Polystep™ A-16–22, 359 g of MMA and 8.7 g of MAA was prepared. A solution of Pennstop 2697 (0.89 g supplied by Elf Atochem) in 30 g of water was added to the reaction mixture from stage 1. The monomer emulsion was added to the reaction mixture in one shot followed by 1.55 g of t-butyl hydroperoxide (70%) in 3.7 g of water and 0.65 g of Sodium sulfoxylate formaldehyde in 33 g of water. The reaction mixture was held at the peak exotherm temperature (71–74° C.) for 5 minutes, and then cooled to 60° C.

A third monomer emulsion containing 102 g of water, 1.85 g of A-16–22, 359 g of MMA and 8.7 g of MAA was prepared and add to the reaction mixture from stage 2 followed by 1.55 g of t-butyl hydroperoxide (70%) in 3.7 g of water and 0.65 g of Sodium sulfoxylate formaldehyde in 33 g of water. The reaction mixture was held at the peak exotherm temperature (71–74° C.) for 5 minutes and cooled to ambient temperature.

The final latex collected after passing through a 100 mesh filter was analyzed to have a solids level of 51.4% and particle size of 430 nm.

Example 6
Adjustment of Aqueous Dispersions to Similar Solids and pH for Use in Preparing Films Portions of the example and comparative emulsions where diluted with deionized water to 35% to 40% weight solids and neutralized with 28% $NH_3$ to a pH of 8.0 to 8.5. In some examples, oligomer were also adjusted in a similar manner, and coalescing agent where added at the levels described in Table 6. These adjusted emulsions, indicated with an "a" suffix, were allowed to equilibrated at least overnight before further testing.

TABLE 6

Composition of the Polymer Portion of Aqueous Dispersion Tested.

| Pol. Ex. No. | Pol. Type (1) | Backbone Composition (2) | Graft Segment Composition (3) | Olig. | % Coa. (4) |
|---|---|---|---|---|---|
| 3.1a | c/coa | 65(78.2 BA/19.5 STY/2.3 g-MAA) | 35(70 MMA/25 EA/5 MAA) | | 5 |
| C-4.1a | r/coa | 50 BA/8.7 EA/24.1 MMA/12.5 Sty/3.2 MAA/1.5 g-MAA | | | 5 |
| 3.1a | c | 65(78.2 BA/19.5 STY/2.3 g-MAA) | 35(70 MMA/25 EA/5 MAA) | | |
| C-4.1a | r | 50 BA/8.7 EA/24.1 MMA/12.5 Sty/3.2 MAA/1.5 g-MAA | | | |
| 3.2a | c/o | 78.8(97.7 BA/2.3 g-MAA) | 21.2(100 MMA)[7] | (5) | |
| 5.1a | sh | 65 (98.6 BA/1.4 AA)/35 (97.6 MMA/2.4 MAA) | | | |
| 3.3a | c | 65(97.7 BA/2.3 g-MAA) | 35(100 MMA)[7] | | |
| 3.4a | c | 65(97.7 BA/2.3 g-MAA) | 35(100 MMA)[8] | | |
| C-4.6a | r | 63.5 BA/35 MMA/1.5 MAA | | | |
| 3.5a | c | 63.5 BA/1.5 g-MAA | 35(80 MMA/20 BMA) | | |
| C-4.2a | r | 63.5 BA/28 MMA/7 BMA/1.5 g-MAA | | | |
| 3.13a | c/o | 88.5 BA/1.5 g-MAA | 10(100 MMA) | (6) | |
| 3.7a | c | 54.2 BA/1.5 g-MAA | 44.3(100 MMA) | | |
| 4.3a | r | 53 BA/45.3 MMA/1.7 MAA | | | |
| 3.8a | c | 72.5(63.6 BA/34.3 Sty/2.1 g-MAA) | 27.5(70 MMA/25 EA/5 MAA) | | |
| C-4.4a | r | 46.2 BA/6.9 EA/19.3 MMA/24.9 Sty/1.4 MAA/1.5 MAA | | | |
| 3.9a | c | 80(63.8 BA/34.3 Sty/1.9 g-MAA) | 20(70 MMA/25 EA/5 MAA) | | |
| C-4.5a | r | 51 BA/5 EA/14 MMA/27.5 Sty/1 MAA/1.5 g-MAA | | | |
| 3.1a | c | 65(78.2 BA/19.5 STY/2.3 g-MAA) | 35(70 MMA/25 EA/5 MAA) | | |
| C-4.1a | r | 50 BA/8.7 EA/24.1 MMA/12.5 Sty/3.2 MAA/1.5 g-MAA | | | |
| 3.10a[9] | c | 65(78.2 BA/19.5 STY/2.3 g-MAA) | 35(71 MMA/25 EA/4 MAA) | | |
| C-4.7a[9] | r | 50 BA/8.7 EA/24.7 MMA/12.5 Sty/2.6 MAA/1.5 g-MAA | | | |
| 3.11a[9] | c | 65(78.2 BA/19.5 STY/2.3 g-MAA) | 35(73 MMA/25 EA/2 MAA) | | |
| C-4.8a[9] | r | 50 BA/8.7 EA/26 MMA/12.5 Sty/12.8 MAA/1.5 g-MAA | | | |
| 3.12a[9] | c | 65(78.2 BA/19.5 STY/2.3 g-MAA) | 35(75 MMA/25 EA) | | |
| C-4.9a[9] | r | 50 BA/8.7 EA/27.3 MMA/12.5 Sty/1.5 g-MAA | | | |

[1]Used in the tables herein, the following abbreviations have these meanings: "disp." = "aqueous dispersion"; "ex." = "example"; "no." = "number"; "pol." = "polymer"; "r" = "random copolymer"; "c" = "comb copolymer"; "sh" = SHE copolymer; "c/coa" = "comb copolymer" plus "coalescent" at 5 weight %; "r/coa" = " random copolymer" plus "coalescent" at 5 weight %; "c/o" = "comb copolymer/oligomer" blend; "g-MAA" = "grafted MAA macromonomer"; "olig." = "oligomer"; and "coa." = "coalescent".

TABLE 6-continued

Composition of the Polymer Portion of Aqueous Dispersion Tested.

| Pol. Ex. No. | Pol. Type (1) | Backbone Composition (2) | Graft Segment Composition (3) | Olig. | % Coa. (4) |
|---|---|---|---|---|---|

(2)When the polymer is a comb copolymer, the numbers inside the parentheses sum to 100 and represent the weight percent of monomer, present as polymerized units, based on the weight of the backbone polymer. The number preceding the open parenthesis is the weight percent of backbone polymer, based on the total weight of the comb copolymer. For random copolymers, the composition of the entire polymer is listed under "backbone", and no parentheses are required.
(3)When the polymer is a comb copolymer, the numbers inside the parentheses sum to 100 and represent the weight percent of monomer, present as polymerized units, based on the weight of the graft segment. The number preceding the open parenthesis is the weight percent of graft segment, based on the total weight of the comb copolymer.
(4)The coalescent, DOWANOL ™ PPh (available from Dow Chemical of Midland, Michigan), was added to the aqueous dispersion at 5 weight percent, based on the weight of polymer solids. DOWANOL ™ PPh is propyl phenyl glycol ether.
(5)The oligomer, prepared in Example 1.5, is a macromonomer which is a homopoloymer of MMA, having an Mn = 3,800, and an Mw = 5,400. The weight ratio of comb copolymer to oligomer is 80:20.
(6)The oligomer, prepared in Example 1.5, is a macromonomer which is a homopoloymer of MMA, having an Mn = 3,800, and an Mw = 5,400. The weight ratio of comb copolymer to oligomer is 58:42.
(7)The graft segment has an Mn = 3,800 and an Mw = 5,400.
(8)The graft segment has an Mn = 11,200 and an Mw = 16,700.
(9)The values listed for Examples 3.10a through 3.12a and C-4.7a through C-4.9a are the values one would use in preparation of the corresponding acrylic graft copolymers (i.e., comb copolymer).

TABLE 7

Glass transition temperatures for the copolymers as calculated using the Fox Equation.

| Pol. Ex. No. | Pol. Type | Tg Backbone (° C.) | Tg Graft segment (° C.) | Tg Overall (° C.) | % Coalescing agent | Tg With Coalescing Agent[1], ° C. |
|---|---|---|---|---|---|---|
| 3.1a | c/coa | −32 | 65 | −5 | 5 | −10 |
| C-4.1a | r/coa | | | −5 | 5 | −10 |
| 3.1a | c | −32 | 65 | −5 | | |
| C-4.1a | r | | | −5 | | |
| 3.2a | c/o | −51 | 105 | −11 | | |
| 5.1a | sh | | | −15 | | |
| 3.3a | c | −51 | 105 | −14 | | |
| 3.4a | c | −51 | 105 | −14 | | |
| C-4.6a | r | | | −14 | | |
| 3.5a | c | −51 | 84 | −17 | | |
| C-4.2a | r | | | −17 | | |
| 3.13a | c/o | −52 | 105 | 3 | | |
| 3.7a | c | −51 | 105 | 0 | | |
| 4.3a | r | | | 1 | | |
| 3.8a | c | −15 | 65 | 4 | | |
| C-4.4a | r | | | 3 | | |
| 3.9a | c | −15 | 65 | −2 | | |
| C-4.5a | r | | | −2 | | |
| 3.1a | c | −32 | 65 | −5 | | |
| C-4.1a | r | | | −5 | | |
| 3.10a(2) | c | −32 | 65 | −5 | | |
| C-4.7a(2) | r | | | −5 | | |
| 3.11a(2) | c | −32 | 66 | −5 | | |
| C-4.8a(2) | r | | | −5 | | |
| 3.12a(2) | c | −32 | 66 | −5 | | |
| C-4.9a(2) | r | | | −5 | | |

(1)Using Tg = −75° C. for the coalescent.
(2)The values listed for Examples 3.10–3.12 and C-4.8 through C-4.10 are the values one would expect in the polymer products.

Method to Prepare Films

Films were prepared by using the method described in Producing Films of Uniform Thickness of Paint, Varnish, and Related Products on Test Panels, ASTM D 823–95, with the modifications detailed below.

For films applied to aluminum (Panel 3003, supplied by ACT Industries, Inc.; Milwaukee, Wis.) and polyethylene panels, Practice E was employed (Hand-Held Blade Film Application). For the aluminum panels, the desired dried film thickness was 50.8 um (2 mils). These films were used for Konig Hardness Pendulum Damping Test, Finger Tack Test, and Mandrel Bend Test. For the polyethylene panels, the desired dried film thickness was 101.6 um (4 mils). The polyethylene panels were treated with Mold Release Agent (Crown, 6075) to facilitate the removal of the dried film with minimum distortion. These films were used for Tensile Properties Test.

For films applied to White Paper panels (Chart Form WB, supplied by Leneta Company, 15 Whitney Road, Mahwah, N.J.), Practice C was employed (Motor-Driven Blade Film Application). The desired dried film thickness was 25.4 um (1 mil). An auxiliary flattening bar was not used. These films were used for Block Testing.

The gap opening of the blade was chosen using the following approximation:

Gap Opening≈(Film Thickness×2)÷% Solids.

Drawdowns were either made in a Constant Temperature and Humidity Room or the panels were placed in the room while still wet. The room conditions were 23±2° C. and 65±5% Relative Humidity. Samples were dried for at least 7 days before testing. If the samples contained coalescent, they were dried for 3½ days as noted above and then 3½ days in a vacuum chamber at <0.69 kPa (=0.1 pound/inch$^2$) with a small bleed valve open to the atmosphere, providing an air sweep of the chamber. The films were then returned to the Constant Temperature and Humidity Room for at least 3 hours before testing.

Method to Measure Film Thickness

In order to verify that the blade gap could be used as a good estimate of dry film thickness over all substrates, thickness values for several dry films on aluminum panels were determined using the method described in Measurement of Dry-Film Thickness of Organic Coatings Using Micrometers, ASTM D 1005–95, as detailed in Procedure A, 6.1.5. These measurements agreed to within 15% of those estimated from Equation 1 above. For the films on polyethylene panels used in Tensile Properties Test, the thicknesses of free films were determined using Procedure B.

Konig Pendulum Hardness

The Konig Hardness of films were determined using Method for Hardness of Organic Coatings by Pendulum Damping Tests, ASTM D 823–95, with the modifications detailed below.

Dry films were prepared as described above. The Konig Pendulum Hardness, Test Method A, was determined for the films using an oscillation counter as described in Note 1.

Tensile Properties Test

The Tensile Properties of free films were determined using Method for Tensile Properties of Organic Coatings, ASTM D 2370–98, with the modifications detailed below.

Dry films were prepared on polyethylene panels as described above. After drying, the top surface of the film was treat with the same mold release agent as used in the film casting. For very tacky films, a light dusting of talc was also applied with a camel hair brush. The edges were taped to reinforce the film and it was slowly removed from the panel. If the sample adhered to the panel, it was chilled with ice or dry ice prior to removing. Samples were cut with a scalpel and template to a dimension of 1.27 cm (½ inch) by 7.62 cm (3 inch). The top and bottom 2.54 cm (1 inch) was reinforced with masking tape leaving a gage length of 2.54 cm (1 inch). Specimens were discarded if they displayed visible flaws, scratches, nicks, tears, or other imperfections likely to cause premature failure during Tensile Property Testing. The thickness of these free films was determined as described above.

The samples were tested in a room with the same temperature and relative humidity as that in which they were conditioned. The crosshead speed was 2.54 cm/minute (1 inch/minute) or 100%/minute for the gage length chosen. The elongation is measured at the point of rupture. The tensile strength is measured at the maximum value. At least 2 samples were tested for each sample. Spurious values were discarded as described in 12.2.2.

Test Method: Finger Tack

Tack is the "stickiness" of the surface of a material. It can be qualitatively measured by Finger Tack which is the ability of the material to stick to a clean, dry finger. While subjective it does give a good, reproducible rating of Tack.

Finger Tack is tested by lightly pushing your freshly washed and dried finger on the film on the end of an Aluminum panel, prepared as described above, and slowly lifting your hand until the panel falls. The position of the panel when it falls yields the rating (Table 8).

TABLE 8

Rating system for the Finger Tack Test.

| Position When Panel Falls | Tack Rating | Rating |
|---|---|---|
| panel does not lift at all | None | 5 |
| up to ~30° | Slight | 4 |
| above 30° but before panel lifts off the surface | Moderate | 3 |
| panel falls as it lifts from the surface | Very | 2 |
| panel is lifted off the surface | Extreme | 1 |

Test Method: Peel Block Resistance

The Peel Block Resistance test was used for rating the resistance of paint films to blocking, i.e., sticking or fusing when they are placed in contact with each other. ASTM Test Method D4946–89 (Reapproved 1999), *Standard Test Method for Blocking Resistance of Architectural Paints*, was followed using a temperature of 48.9° C. (120° F.).

The samples were rated for block resistance on a scale of 0 to 10. Block resistance is reported on a numerical scale of 0 to 10, which corresponds to a subjective tack and seal rating determined by the operator. This rating system is defined below in appropriate descriptive terms (Table 9).

TABLE 9

Rating Scale for Block Resistance Test.

| Rating | Description | Tack | Seal as percent of contact area |
|---|---|---|---|
| 10 | perfect | none | none |
| 9 | excellent | trace | none |
| 8 | Very good | slight | none |
| 7 | Good | slight | none |
| 6 | Good | moderate | none |
| 5 | Fair | moderate | none |
| 4 | Fair | severe | none |
| 3 | Poor | | 5–25% |
| 2 | Poor | | 25–50% |
| 1 | Poor | | 50–75% |
| 0 | Very poor | | 100% |

For purposes of calculation of the Block Advantage value, $A_B$, the scale of Table 9 and ASTM Standard Test Method D4946–89 was modified to a 1 to 5 scale. Ratings of 0, 1, and 2 are reported as 1; 3 and 4 as 2; 5 and 6 as 3; 7 and 8 as 4; and 9 and 10 as 5.

Test Method: Low Temperature Flexibility via Mandrel Bend Test

The low temperature flexibility of films was determined by using the Mandrel Bend Test of Attached Organic Coatings, ASTM D522–93a, with the modifications detailed below.

Films on Aluminum panels were prepared as previously described. The thickness of several random samples was determined with a dial micrometer gauge. They were 50.8±7.6 µm (2±0.3 mils), so the target value of 50.8 µm (2 mils) was used in the calculation of % elongation. Test strips were cut from the original panels to a size of 2.54 cm×10.16 cm (1 inch by 4 inch). These strips and test equipment were conditioned at −35° C., or −10° C., for 4 hours prior to testing.

Test Method B, the Cylindrical Mandrel Test, was used to determine the elongation of the film. In addition to the specified test equipment, 5.08 cm (2 inch) and 10.16 (4 inch) cm diameter steel tubes were used. The bend time was 1 second instead of the 15 second bend time specified for elongation measurements. No correction was attempted for the difference in bend rate.

The % Elongation and Correction Factors for the 5.08 cm (2 inch) and 10.16 cm (4 inch) diameter mandrels were linearly extrapolated on a log-log plot from those at 2.54 cm and smaller diameter and are given in Table 10. The calculated Total Elongation for 50.8 μm films is also given.

TABLE 10

Elongation, Correction for Film thickness, and Total Elongation

| Mandrel diameter (cm) | Mandrel diameter (inches) | Elongation (%) | Correction for film thickness | Total elongation for 50.8 μm films (%) |
|---|---|---|---|---|
| 0.318 | .125 | 28.00 | 1.40 | 30.8 |
| 0.635 | .250 | 14.00 | 0.71 | 15.4 |
| 1.27 | .500 | 6.75 | 0.38 | 7.5 |
| 2.54 | 1 | 3.30 | 0.21 | 3.7 |
| 5.08 | 2 | 1.60 | 0.11 | 1.8 |
| 10.16 | 4 | 0.78 | 0.06 | 0.9 |

The test results for the film properties as described above are given in Table 11.

TABLE 11

Results for Tests of Hardness and Softness.

| Pol. Ex. No. | Pol. Type | Konig(s) | Tack | Tensile Strength (kPa) | Block[1] 48.9° C. (120° F.) 30 minutes | Elongation at 23° C. (%) | Mandrel Elongation At −35° C.[2] (%) |
|---|---|---|---|---|---|---|---|
| 3.1a | c/coa | 21.0 | 5 | 5,350 | 2 | 410 | 30.8 |
| C-4.1a | r/coa | 4.2 | 1 | 2,765 | 1 | 664 | 0.9 |
| 3.1a | c | 18.9 | 4 | 5,343 | 1 | 421 | 3.7 |
| C-4.1a | r | 8.4 | 2 | 6,267 | 1 | 756 | 1.8 |
| 3.2a | c/o | 8.4 | 1 | 2,710 | 1 | 534 | 30.8 |
| 5.1a | sh | 8.4 | 2 | 1,255 | 1 | 92 | 7.5 |
| 3.3a | c | poor film | poor film | poor film | poor film | poor film | poor film |
| 3.4a | c | poor film | poor film | poor film | poor film | poor film | poor film |
| C-4.6a | r | 7.0 | 1 | 1,634 | 1 | 1,119 | 3.7 |
| 3.5a | c | 26.6 | 5 | 3,185 | 4 | 104 | 30.8 |
| C-4.2a | r | 5.6 | 1 | 786 | 1 | 1,107 | 7.5 |
| 3.13a | c/o | 11.2 | 4 | 2,717 | 2 | 593 | 30.8 |
| 3.7a | c | poor film | poor film | poor film | poor film | poor film | poor film |
| 4.3a | r | 17.5 | 4 | 4,309 | 1 | 387 | 1.8 |
| 3.8a | c | 23.8 | 5 | 7,619 | 2 | 403 | 1.8 |
| C-4.4a | r | 22.4 | 4 | 5,936 | 1 | 430 | 0.9 |
| 3.9a | c | 14.0 | 4 | 5,212 | 1 | 389 | 3.7 |
| C-4.5a | r | 8.4 | 2 | 3,923 | 1 | 728 | 1.8 |
| 3.1a | c | 18.9 | 4 | 5,343 | 1 | 421 | 3.7 |
| C-4.1a | r | 8.4 | 2 | 6,267 | 1 | 756 | 1.8 |
| 3.10a[3] | c | 18.9 | 4 | 5,343 | 1 | 421 | 3.7 |
| C-4.7a[3] | r | 8.4 | 2 | 6,267 | 1 | 756 | 1.8 |
| 3.11a[3] | c | 18.9 | 4 | 5,000 | 1 | 400 | 3.7 |
| C-4.8a[3] | r | 8.4 | 2 | 6,267 | 1 | 756 | 1.8 |
| 3.12a[3] | c | 18.9 | 4 | 4,500 | 1 | 375 | 3.7 |
| C-4.9a[3] | r | 8.4 | 2 | 6,267 | 1 | 756 | 1.8 |

[1]The test method for "block resistance" (supra) rates block resistance on a scale of 0 to 10 with 0 being "very poor" and 10 being "perfect". For purposes of calculation of the Block Advantage value, $A_B$, the scale was modified to a 1 to 5 scale in Table 11. Ratings of 0, 1, and 2 are reported as 1; 3 and 4 as 2; 5 and 6 as 3; 7 and 8 as 4; and 9 and 10 as 5.
[2]Dispersion Examples 3.8a and 3.9a and Comparatives C-4.4a and C-4.5a were tested at −10° C. to assure that the test temperature was lower than the calculated average Tg of the polymers.
[3]The values listed for Examples 3.10a through 3.12a and C-4.7a through C-4.9a are the values one would expect in the polymer products.

The calculated Advantage Values for the individual Advantage Terms described above are given in Table 12.

TABLE 12

Advantage Values.

| Pol. Ex. No. | Pol. Type | Measures of Hardness | | | | Measures of Softness | |
|---|---|---|---|---|---|---|---|
| | | $A_K$ (%) | $A_T$ (%) | $A_S$ (%) | $A_B$ (%) | $A_E$ (%) | $A_F$ (%) |
| 3.1a | c/coa | 400 | 400 | 94 | 100 | −38 | 3322 |
| C-4.1a | r/coa | 0 | 0 | 0 | 0 | 0 | 0 |
| 3.1a | c | 125 | 100 | −15 | 0 | −44 | 106 |
| C-4.1a | r | 0 | 0 | 0 | 0 | 0 | 0 |
| 3.2a | c/o | 20 | 0 | 66 | 0 | −52 | 732 |
| 5.1a | sh | 20 | 100 | −23 | 0 | −92 | 103 |
| 3.3a | c | −100 | −100 | −100 | −100 | −100 | −100 |
| 3.4a | c | −100 | −100 | −100 | −100 | −100 | −100 |
| C-4.6a | r | 0 | 0 | 0 | 0 | 0 | 0 |
| 3.5a | c | 375 | 400 | 305 | 300 | −91 | 311 |
| C-4.2a | r | 0 | 0 | 0 | 0 | 0 | 0 |
| 3.13a | c/o | −36 | 0 | −37 | 100 | 53 | 1611 |
| 3.7a | c | −100 | −100 | −100 | −100 | −100 | −100 |

TABLE 12-continued

Advantage Values.

| Pol. Ex. No. | Pol. Type | Measures of Hardness | | | | Measures of Softness | |
|---|---|---|---|---|---|---|---|
| | | $A_K$ (%) | $A_T$ (%) | $A_S$ (%) | $A_B$ (%) | $A_E$ (%) | $A_F$ (%) |
| 4.3a | r | 0 | 0 | 0 | 0 | 0 | 0 |
| 3.8a | c | 6 | 25 | 28 | 100 | −6 | 100 |
| C-4.4a | r | 0 | 0 | 0 | 0 | 0 | 0 |
| 3.9a | c | 67 | 100 | 33 | 0 | −47 | 106 |
| C-4.5a | r | 0 | 0 | 0 | 0 | 0 | 0 |
| 3.1a | c | 125 | 100 | −15 | 0 | −44 | 106 |
| C-4.1a | r | 0 | 0 | 0 | 0 | 0 | 0 |
| 3.10a[1] | c | 125 | 100 | −15 | 0 | −44 | 106 |
| C-4.7a[1] | r | 0 | 0 | 0 | 0 | 0 | 0 |
| 3.11a[1] | c | 125 | 100 | −20 | 0 | −47 | 106 |
| C-4.8a[1] | r | 0 | 0 | 0 | 0 | 0 | 0 |
| 3.12a[1] | c | 125 | 100 | −28 | 0 | −50 | 106 |
| C-4.9a[1] | r | 0 | 0 | 0 | 0 | 0 | 0 |

[1]The values listed for Examples 3.10a–3.12a and C-4.7a through C-4.9a are the values one would expect in the polymer products.

The Advantage Values cumulative Hard, Soft and Hard/Soft Balance Advantage Terms as described below are given in Table 13.

TABLE 13

Advantage Values: Average Hardness, Softness, and Hard/Soft Balance[1].

| Pol. Ex. No. | Pol. Type | $A_{Hard}$ (%) | $A_{Soft}$ (%) | $A_{HSB}$ (%) |
|---|---|---|---|---|
| 3.1a | c/coa | 248 | 1,642 | 945 |
| C-4.1a | r/coa | 0 | 0 | 0 |
| 3.1a | c | 53 | 31 | 42 |
| C-4.1a | r | 0 | 0 | 0 |
| 3.2a | c/o | 21 | 340 | 181 |
| 5.1a | sh | 24 | 5 | 15 |
| 3.3a | c | −100 | −100 | −100 |
| 3.4a | c | −100 | −100 | −100 |
| C-4.6a | r | 0 | 0 | 0 |
| 3.5a | c | 345 | 110 | 228 |
| C-4.2a | r | 0 | 0 | 0 |
| 3.13a | c/o | 7 | 832 | 419 |
| 3.7a | c | −100 | −100 | −100 |
| 4.3a | r | 0 | 0 | 0 |
| 3.8a | c | 40 | 47 | 43 |
| C-4.4a | r | 0 | 0 | 0 |
| 3.9a | c | 50 | 29 | 40 |
| C-4.5a | r | 0 | 0 | 0 |
| 3.1a | c | 53 | 31 | 42 |
| C-4.1a | r | 0 | 0 | 0 |
| 3.10a[2] | c | 53 | 31 | 42 |
| C-4.7a[2] | r | 0 | 0 | 0 |
| 3.11a[2] | c | 51 | 29 | 40 |
| C-4.8a[2] | r | 0 | 0 | 0 |
| 3.12a[2] | c | 49 | 28 | 38 |
| C-4.9a[2] | r | 0 | 0 | 0 |

[1]$A_{Hard} = (A_K + A_T + A_S + A_B)/4$
$A_{Soft} = (A_E + A_F)/2$
$A_{HSB} = (A_{Hard} + A_{Soft})/2$.
[2]The values listed for Examples 3.10a through 3.12a and C-4.7a through C-4.9a are the values one would expect in the polymer products.

The values of the Advantage terms on the right side of each of these equations are listed in Table 13.

The values of the Hard/Soft Balance Advantage terms, $A_{HSB}$, of Table 13 show that the comb copolymers of the present invention display an improvement in the balance of hardness and softness of at least 25% when compared with random copolymers having the same overall composition. A comparison of a SHE copolymer with a comb copolymer further reveals performance of the comb copolymer which is superior to that of the SHE copolymer (15%) having the same composition.

Example 7

Adjustment of Aqueous Dispersions to Similar Solids and pH for Use in Preparing Films Portions of the example and comparative aqueous dispersions where diluted with deionized water to 35% to 40% weight solids and neutralized with 28% $NH_3$ to a pH of 8.0 to 8.5. These adjusted emulsions, as indicated by the "a" suffix, were allowed to equilibrated at least overnight before further blending or testing. Film preparation and testing were done as described above.

TABLE 14

Composition of the Polymer Portion of Aqueous Dispersion Tested.

| Pol. Ex. No. | Pol. Type (1) | Backbone Composition (2) | Graft Segment Composition (3) |
|---|---|---|---|
| 3.4a | c | 65(97.7 BA/2.3 g-MAA) | 35(100 MMA) |
| 3.14a | c | 98(98.5 BA/1.5 g-MAA) | 2(100 MMA) |
| 3.15a | c | 80(98.1BA/1.9g-MAA) | 20(100 MMA) |
| 3.16a[4] | c/c | | |

[1]Used in the tables herein, the following abbreviations have these meanings: "disp." = "aqueous dispersion" not used????; "ex." "example"; "no." = "number"; "pol." = "polymer"; "r" = "random copolymer"; "c" = "comb copolymer"; "c/c" = "a blend comprising at least 2 comb copolymers"; "sh" = SHE copolymer;"c/coa" = "comb copolymer" plus "coalescent" at 5 weight %; "r/coa" = "random copolymer" plus "coalescent" at 5 weight % "r/coa" ="random copolymer" plus "coalescent" at 5 weight % ; "c/o" = "comb copolymer / oligomer" blend; "g-MAA" ="grafted MAA macromonomer"; "olig." ="oligomer"; and "coa." = "coalescent".
[2]When the polymer is a comb copolymer, the numbers inside the parentheses sum to 100 and represent the weight percent of monomer, present as polymerized units, based on the weight of the backbone polymer. The number preceding the open parenthesis is the weight percent of backbone polymer, based on the total weight of the comb copolymer. For random copolymers, the composition of the entire polymer is listed under "backbone", and no parentheses are required.
[3]When the polymer is a comb copolymer, the numbers inside the parentheses sum to 100 and represent the weight percent of monomer, present as polymerized units, based on the weight of the graft segment. The number preceding the open parenthesis is the weight percent of graft segment, based on the total weight of the comb copolymer.
[4]Example 3.16a is a blend of 45.5% of Example 3.14a with 55.5% of Example 3.4a yielding an average composition equivalent to Example 3.15a.

TABLE 15

Results for Tests of Hardness and Softness.

| Pol. Ex. No. | Pol. Type | Konig(s) | Tack | Tensile Strength (kPa) | Block[1] 48.9° C. (120° F.) 30 minutes | Elongation at 23° C. (%) | Mandrel Elongation At −35° C. (%) |
|---|---|---|---|---|---|---|---|
| 3.4a | c | poor film | poor film | poor film | poor film | poor film | poor film |
| 3.14a | c | 9.8 | 2 | 579 | 1 | 537 | 30.8 |
| 3.15a | c | 11.7 | 4 | 1,400 | 2 | 482 | 30.8 |
| 3.16a | c/c | 12.1 | 4 | 1,586 | 1 | 717 | 30.8 |

[1]The test method for "block resistance" (supra) rates block resistance on a scale of 0 to 10 with 0 being "very poor" and 10 being "perfect". For purposes of calculation of the Block Advantage value, $A_B$, the scale was modified to a 1 to 5 scale in Table 15. Ratings of 0, 1, and 2 are reported as 1; 3 and 4 as 2; 5 and 6 as 3; 7 and 8 as 4; and 9 and 10 as 5.

The results of film testing are given in Table 15. No Advantage Values are calculated since a common control is not possible over the series of examples as the macromonomer level was changed. Comparisons made by inspection of the data show that blending two comb copolymers which formed a poor film (Example 3.4a) and which had relatively poor performance (Example 3.16a) give a dispersion (Example 31.6a) yielding a film with performance superior to either component. The blend also has performance better than the performance of a comb copolymer of equivalent overall composition (example 3.15a). In these examples, macromonomer level was varied. Similar results are anticipated for varying macromonomer, oligomer, and backbone composition and level, Tg, hydrophilicity, and molecular weight as well as particle size of the individual comb copolymers or oligomer dispersions. One or more of the blend components could be a polymer other than a comb-copolymer.

We claim:

1. An aqueous dispersion, comprising a plurality of water insoluble segmental copolymer particles, wherein said particles comprise comb copolymer, and wherein said comb copolymer comprises:
   (a) from 2 weight percent to 90 weight percent of macromonomer, as polymerized units, based on the total weight of said comb copolymer, wherein:
      (i) said macromonomer is water insoluble and comprises from 10 to 1000 polymerized units of at least one first ethylenically unsaturated monomer, no polymerized mercapto-olefin compounds, and less than 5 weight percent polymerized acid-containing monomer;
      (ii) said macromonomer has a molecular weight distribution such that its ratio of Mw/Mn is at least 1.25, wherein said Mw is the weight average molecular weight of the macromonomer and said Mn is the number average molecular weight of said macromonomer; and
      (iii) said macromonomer is a macromonomer prepared by aqueous based polymerization; and
   (b) from 10 weight percent to 98 weight percent of polymerized units of at least one second ethylenically unsaturated monomer, based on the total weight of said comb copolymer.

2. The aqueous dispersion of claim 1, wherein said aqueous dispersion has a Hard/Soft Balance Advantage value of at least 25%.

3. The aqueous dispersion of claim 1:
   wherein said comb copolymer comprises a backbone and at least one graft segment;
   wherein said graft segment is derived, as a polymerized unit, from said macromonomer; and
   wherein said comb copolymer is present as a plurality of comb copolymer particles.

4. The aqueous dispersion of claim 3, wherein said comb copolymer has a weight average molecular weight of 50,000 to 2,000,000.

5. The aqueous dispersion of claim 3, wherein said graft segment comprises, as polymerized units, less than 1 weight percent acid containing monomer, based on the total weight of said macromonomer.

6. The aqueous dispersion of claim 3, wherein said graft segment contains, as polymerized units, at least one unit derived from a non-methacrylate monomer.

7. The aqueous dispersion of claim 3, wherein said graft segment comprises, as polymerized units, from 5 weight percent to 50 weight percent of a non-methacrylate monomer, based on the weight of said macromonomer.

8. The aqueous dispersion of claim 3, wherein said graft segment has a degree of polymerization of from 10 to less than 50, where the degree of polymerization of said graft segment is expressed as the degree of polymerization of said macromonomer.

9. The aqueous dispersion of claim 3, wherein said graft segment has a glass transition temperature of 30° C. to 130° C.

10. The aqueous dispersion of claim 3, wherein said backbone has a glass transition temperature of −90° C. to 50° C.

11. The aqueous dispersion of claim 3, wherein said graft segment is present in the amount of 1 to 70 weight percent based on the weight of said comb copolymer.

12. The aqueous dispersion of claim 3, further comprising a coalescent in an amount of from 0 weight percent to 40 weight percent, based on the weight of said comb copolymer.

13. The aqueous dispersion of claim 3, further comprising an oligomer in an amount of 1 to 50 weight percent, based on the weight of said comb copolymer.

14. The aqueous dispersion of claim 3, wherein said comb copolymer is produced by a polymerization method comprising the steps of:
   (a) forming a macromonomer aqueous emulsion comprising a plurality of water-insoluble particles of macromonomer, wherein said macromonomer comprises polymerized units of at least one first ethylenically unsaturated monomer, said macromonomer further having:
  (i) a degree of polymerization of from 10 to 1000;
  (ii) at least one terminal ethylenically unsaturated group;
  (iii) less than 5 weight percent polymerized acid-containing monomer, based on the weight of said macromonomer;
  (iv) no polymerized mercaptan-olefin compounds; and
  (v) said macromonomer has a molecular weight distribution such that its ratio of Mw/Mn is at least 1.25, wherein said Mw is the weight average molecular weight of the macromonomer and said Mn is the number average molecular weight of said macromonomer;
(b) forming a monomer composition comprising at least one second ethylenically unsaturated monomer; and
(c) combining at least a portion of said macromonomer aqueous emulsion and at least a portion of said monomer composition to form a polymerization reaction mixture; and
(d) polymerizing said macromonomer with said second ethylenically unsaturated monomer in the presence of an initiator to produce said plurality of comb copolymer particles.

15. The aqueous dispersion of claim 14, wherein said polymerization reaction mixture further comprises a macromolecular organic compound.

16. A method of forming a film comprising the steps of:
(a) forming a macromonomer aqueous emulsion comprising a plurality of water-insoluble particles of macromonomer, wherein said macromonomer comprises polymerized units of at least one first ethylenically unsaturated monomer, said macromonomer further having:
  (i) a degree of polymerization of from 10 to 1000;
  (ii) at least one terminal ethylenically unsaturated group;
  (iii) less than 5 weight percent polymerized acid-containing monomer, based on said macromonomer;
  (iv) no polymerized mercaptan-olefin compounds;
  (v) a molecular weight distribution such that its ratio of Mw/Mn is at least 1.25, wherein said Mw is the weight average molecular weight of the macromonomer and said Mn is the number average molecular weight of said macromonomer; and
  (vi) said macromonomer is a macromonomer prepared by aqueous based polymerization;
(b) forming a monomer composition comprising at least one second ethylenically unsaturated monomer;
(c) combining at least a portion of said macromonomer aqueous emulsion and at least a portion of said monomer composition to form a polymerization reaction mixture;
(d) polymerizing said macromonomer with said second ethylenically unsaturated monomer in the presence of an initiator to produce an aqueous dispersion comprising a plurality of water-insoluble comb copolymer particles;
(e) applying said aqueous dispersion to a substrate; and
(f) drying, or allowing to dry, said applied aqueous dispersion,
wherein said comb copolymer comprises:
  from 2 weight percent to 90 weight percent of said macromonomer, as polymerized units, based on the total weight of said comb copolymer; and
  from 10 weight percent to 98 weight percent of said second ethylenically unsaturated monomer, as polymerized units, based on the total weight of said comb copolymer.

17. The method of claim 16, wherein said polymerization reaction mixture further comprises a macromolecular organic compound.

18. A film produced by the method of claim 16.

19. The method of claim 16 wherein said aqueous dispersion has a Hard/Soft Balance Advantage value of at least 25%.

* * * * *